US 6,991,575 B2

(12) United States Patent
Inoue

(10) Patent No.: US 6,991,575 B2
(45) Date of Patent: Jan. 31, 2006

(54) CONTINUOUSLY VARIABLE TRANSMISSION APPARATUS

(75) Inventor: Eiji Inoue, Kanagawa (JP)

(73) Assignee: NSK LTD, Tokyo (JP)

( * ) Notice: Subject to any disclaimer, the term of this patent is extended or adjusted under 35 U.S.C. 154(b) by 107 days.

(21) Appl. No.: 10/777,970

(22) Filed: Feb. 13, 2004

(65) Prior Publication Data
US 2004/0204283 A1 Oct. 14, 2004

(30) Foreign Application Priority Data
Feb. 14, 2003 (JP) .................................... P.2003-035877

(51) Int. Cl.
*F16H 37/02* (2006.01)

(52) U.S. Cl. ..................................... 475/216
(58) Field of Classification Search ................ 475/216, 475/208
See application file for complete search history.

(56) References Cited

U.S. PATENT DOCUMENTS

| 6,251,039 B1 | 6/2001 | Koga | |
| 6,859,709 B2 * | 2/2005 | Joe et al. | 701/51 |
| 2002/0028722 A1 * | 3/2002 | Sakai et al. | 475/214 |
| 2003/0216216 A1 | 11/2003 | Inoue et al. | |

FOREIGN PATENT DOCUMENTS

| JP | 10-103461 A1 | 4/1998 |
| JP | 10103461 A * | 4/1998 |
| JP | 3016409 B2 | 12/1999 |

* cited by examiner

Primary Examiner—Dirk Wright
(74) Attorney, Agent, or Firm—Sughrue Mion, PLLC

(57) ABSTRACT

A continuously variable transmission apparatus having input and output shafts, a toroidal-type continuously variable transmission unit (CVT unit), a gear-type differential unit with gears, and a control unit, the CVT unit has; input and output side disks, power rollers, input and output side rotation sensors, wherein the differential unit has; a first input portion and a second input portion, and wherein the control unit regulates the transmission ratio of the CVT unit so as to change relative displacement speeds of the gears of the differential unit to thereby convert the rotational state of the output shaft to forward and backward rotations with a stationary state being interposed therebetween, with the input shaft being kept rotating in one direction, and to calculate a rotational speed of the output shaft based on rotational speeds of the input and output side disks and a gear ratio of the differential unit.

2 Claims, 10 Drawing Sheets

CONTINUOUSLY VARIABLE TRANSMISSION APPARATUS

BACKGROUND OF THE INVENTION

1. Field of the Invention

The present invention relates to an improvement in a continuously variable transmission apparatus incorporating a toroidal-type continuously variable transmission unit which is used as a vehicle (automotive) automatic transmission apparatus, and more particularly to an improvement in characteristic when a vehicle is stationary or drives at extremely low speeds.

2. Description of Related Art

The usage of a toroidal-type continuously variable transmission unit as shown in FIGS. 4 to 6 as an automotive automatic transmission apparatus has been studied and has now been implemented partially. This toroidal-type continuously variable transmission unit is such as to be called a double-cavity type, in which input side disks 2, 2 are supported around both end portions of an input shaft 1 via ball splines 3, 3. Consequently, these two input side disks 2, 2 are supported coaxially with each other and rotatably in a synchronous fashion. In addition, an output gear 4 is supported around an intermediate portion of the input shaft 1 in such a manner as to freely rotate relative to the input shaft 1. Then, output side disks 5, 5 are brought into spline engagement with both end portions of a cylindrical portion provided in a central portion of the output gear 4, respectively. Consequently, both the output side disks 5, 5 rotate together with the output gear 4 in a synchronous fashion.

In addition, a plurality (normally, two to three) of power rollers 6, 6 are interposed between the input side disk 2, 2 and the output side disk 5, 5, respectively. The power rollers 6, 6 are supported rotatably on inner surfaces of trunnions 7, 7 via support shafts 8, 8 and a plurality of rolling bearings, respectively. The trunnions 7, 7 each freely swing to be displaced about pivot shafts 9, 9 which are provided on longitudinal (in a vertical direction in FIGS. 4 and 6, and in a direction normal to the surface of the piece of paper on which FIG. 5 is illustrated) end portions of the trunnions 7, 7 coaxially therewith, respectively. While operations of inclining the respective trunnions 7, 7 are implemented by displacing the trunnions 7, 7 in axial directions of the pivot shafts 9, 9 by hydraulic actuators 10, 10, inclination angles of all the trunnions 7, 7 are synchronized with each other hydraulically and mechanically.

Namely, when changing the inclination angles of the respective trunnions 7, 7 in order to change the transmission ratio between the input shaft 1 and the output gear 4, the respective trunnions 7, 7 are displaced in opposite directions by the respective actuators 10, 10, for example, the right-hand side power roller 6 in FIG. 6 being displaced downwardly in the same drawing and the left-hand side power roller 6 in FIG. 6 being displaced upwardly in the same drawing, respectively. As a result, the orientations of tangential forces change which act on abutment portions between circumferential surfaces of the respective power rollers 6, 6 and inner surfaces of the respective input side disks 2, 2 and the respective output side disks 5, 5 (a side slip is generated at the abutment portions). Then, in association with the change in orientation of the forces, the respective trunnions 7, 7 swing (incline) in the opposite directions to each other about the pivot shafts 9, 9 pivotally supported on support plates 11, 11. As a result, the abutment positions between the circumferential surfaces of the respective power rollers 6, 6 and the inner surfaces of the input and output side disks 2, 5 change, and the rotational transmission ratio between the input shaft 1 and the output gear 4 changes.

The supply and discharge of hydraulic fluid to and from the respective actuators 10, 10 are implemented by a single control valve 12 irrespective of the number of actuators 10, 10, and it is designed that the movement of any one of the trunnions 7, 7 is fed back to the control valve 12. The control valve 12 has a sleeve 14 adapted to be displaced axially (in left and right directions in FIG. 6, and in directions normal to the surface of the piece of paper on which FIG. 4 is illustrated) by a stepping motor 13 and a spool 15 which is fittingly installed on an inside-diameter side of the sleeve 14 in such a manner as to be displaced axially. In addition, a precess cam 18 is fixed to an end portion of either of rods 17, 17 attached to the trunnions 7, 7 to connect the respective trunnions 7, 7 with pistons 16, 16 of the respective actuators 10, 10, whereby a feedback mechanism is configured in which the movement of the rod 17, that is, a resultant value of an axial displacement amount and a rotational displacement amount thereof is transmitted to the spool 15 via the precess cam 18 and a link arm 19. In addition, a synchronous cable 20 is provided so as to extend between the respective trunnions 7, 7 so that the inclination angles of the respective trunnions 7, 7 can also mechanically be synchronized with each other should the hydraulic system fail.

In changing the transmission ratio, the sleeve 14 is displaced by the stepping motor 13 to a predetermined position which matches a transmission ratio attempted to be obtained to thereby open a flow path of the control valve 12 in a predetermined direction. As a result, the hydraulic fluid is sent into the respective actuators 10, 10 in a predetermined direction, whereby the actuators 10, 10 displaces the trunnions 7, 7 in a predetermined direction, respectively. Namely, as the hydraulic fluid is sent in, the respective trunnions 7, 7 are displaced in the axial directions of the respective pivot shafts 9, 9 and swing about the pivot shafts 9, 9, respectively. Then, the movement (the axial and swinging displacements) of any one 7 of the trunnions is transmitted to the spool 15 via the precess cam 18 fixed to the end portion of the rod 17 and the link arm 19 to thereby displace the spool 15 axially. As a result, with the trunnion 7 being displaced a predetermined amount, the flow path of the control valve 12 is closed, and the supply and discharge of hydraulic fluid to and from the respective actuators 10, 10 are stopped.

The movement of the control valve 12 based on the displacements of the trunnion 7 and a cam surface 21 of the precess cam 18 as the aforesaid occurs will be as follows. Firstly, when the trunnion 7 is displaced axially as the flow path of the control valve 12 is opened, as has been described previously, the trunnion 7 starts to swing to be displaced about the pivot shafts 9, 9 by virtue of the side slip generated at the abutment portions between the circumferential surface of the power roller 6 and the inner surfaces of the input side disk 2 and the output side disk 5. In addition, the displace of the cam surface 21 in association with the axial displacement of the trunnion 7 is transmitted to the spool 15 via the link arm 19, and the spool 15 is then displaced axially to thereby change the changeover state of the control valve 12. To be specific, the control valve 12 changes over in a direction in which the trunnion 7 is returned to a neutral position by the actuator 10.

Consequently, the trunnion 7 starts to be displaced in the opposite direction so as to be returned to the neutral position immediately the trunnion 7 is displaced axially. However, as long as the trunnion 7 needs to be displaced from the neutral position, the trunnion 7 continues to swing about the respective pivot shafts 9, 9. As a result, a displacement with respect to a circumferential direction of the cam surface 21 of the precess cam 18 is transmitted to the spool 15 via the link arm 19, whereby the spool 15 is displaced axially. Then, at the same time that the trunnion 7 returns to the neutral position with the inclination angle of the trunnion 7 having reached the predetermined angle that matches the transmission ratio attempted to be obtained, the control valve 12 is closed, and the supply and discharge of hydraulic fluid to and from the actuator 10 is stopped. As a result of this, the inclination angle of the trunnion 7 becomes an angle which matches an amount in which the sleeve 14 is displaced axially by the stepping motor 13.

When the toroidal-type continuously variable transmission unit described above is operated, one of the input side disks 2 (the left-hand side disk in FIGS. 4, 5) is rotatably driven by a drive shaft 22 connecting to a drive source such as an engine via a loading cam-type pressing device 23 which is shown in the figures. As a result, the pair of input side disks 2, 2 which are supported on the end portions of the input shaft 1 rotate synchronously while being pressed against in directions in which they approach each other. Then, the rotations are transmitted via the power rollers 6, 6 to the output side disks 5, 5, respectively, so as to be taken from the output gear 4.

When the power is transmitted from the input side disks 2, 2 to the output side disks 5, 5, respectively, as has been described above, as friction is generated at rolling contact portions (traction portions) between the circumferential surfaces of the power rollers 6, 6 supported on the inner surfaces of the trunnions 7, 7 and the inner surfaces of the respective disks 2, 5, axial forces of the pivot shafts 9, 9 provided on the end portions of the respective trunnions 7, 7 are applied to the trunnions 7, 7, respectively. This force is referred to as a so-called 2 Ft, and the magnitude thereof is proportional to a torque transmitted from the respective input side disks 2, 2 to the respective output side disks 5, 5 (or, from the respective output side disks 5, 5 to the respective input side disks). Then, the force 2 Ft is borne by the respective actuators 10, 10. Consequently, in an operation of the toroidal-type continuously variable transmission unit, a difference in pressure between pairs of hydraulic pressure chambers 24a, 24b existing on both sides of the pistons 16, 16 which constitute the respective actuators 10, 10 is proportional to the magnitude of the force 2 Ft.

When changing the rotational speeds between the input shaft 1 and the output gear 4, firstly in the event that a reduction in speed is implemented between the input shaft 1 and the output gear 4, the respective trunnions 7, 7 are moved in the axial directions of the respective pivot shafts 9, 9 by the respective actuators 10, 10, and the respective trunnions 7, 7 are caused to swing to positions shown in FIG. 5. Then, as shown in FIG. 5, the circumferential surfaces of the respective power rollers 6, 6 are brought into abutment with the inner surfaces of the respective input side disks 2, 2 at portions closer to the centers thereof and the inner surfaces of the respective output side disks 5, 5 at portions closer to the outer circumferences thereof. On the contrary, in the event that an increase in speed is implemented, the respective trunnions 7, 7 are caused to swing in opposite directions to those shown in FIG. 5, and the respective trunnions 7, 7 are inclined so that the circumferential surfaces of the respective power rollers 6, 6 are brought into abutment with the inner surfaces of the input side disks 2, 2 at portions closer to the outer circumferences thereof and the inner surfaces of the output side disks 5, 5 at portions closer to the centers thereof. In case the inclination angles of the respective trunnions 7, 7 are made to be intermediate, an intermediate transmission ratio (speed ratio) can be obtained between the input shaft 1 and the output gear 4.

Furthermore, when incorporating the toroidal-type continuously variable transmission unit which is constructed and which operates as has been described above in an actual automotive continuously variable transmission unit, it has conventionally been proposed that the toroidal-type continuously variable transmission unit is combined with a gear-type differential unit such as using a planetary gear mechanism so as to constitute a continuously variable transmission apparatus. For example, described in U.S. Pat. No. 6,251,039 is a continuously variable transmission apparatus in which the rotational state of an output shaft is changed over from forward to backward rotations or vice versa with a stationary state being interposed therebetween with an input shaft being kept rotating in one direction, this being referred to as a so-called geared neutral. FIG. 7 illustrates the continuously variable transmission apparatus described in the U.S. Pat. No. 6,251,039. This continuously variable transmission apparatus is constituted by a toroidal-type continuously variable transmission unit 25 and a planet gear-type transmission unit 26. Of the two transmission units, the toroidal-type continuously variable transmission unit 25 includes an input shaft 1, a pair of input side disks 2, 2, an output side disk 5a and a plurality of power rollers 6, 6. In the illustrated example, the output side disk 5a is such as to be constructed by allowing outer surfaces of a pair of output side disks to abut each other so that the pair of output side disks become integrated as a whole.

In addition, the planet gear-type transmission 26 includes a carrier 27 which is fixedly connected to the input shaft 1 and one (the right-hand side one in FIG. 7) of the input side disks 2. A primary transmission shaft 29 having planet gear elements 28a, 28b fixedly provided at end portions thereof is rotatably supported on the carrier 27 at a radially intermediate portion thereof. In addition, a secondary transmission shaft 31 having sun gears 30a, 30b fixedly provided at end portions thereof is supported rotatably and coaxially with the input shaft 1 on an opposite side to the input shaft 1 with the carrier 27 being held therebetween. Then, the respective planet gear elements 28a, 28b are brought into mesh engagement, respectively, with a sun gear 33 fixedly provided on a distal end portion (a right end portion in FIG. 7) of a hollow rotational shaft 32 which is connected to the output side disk 5a at a proximal end portion (a left end portion in FIG. 7) thereof and the sun gear 30a fixedly provided on one end portion (left end portion in FIG. 7) of the secondary transmission shaft 31. In addition, one of the planet gear elements (the left-hand side element) 28a is brought into mesh engagement with a ring gear 35 which is provided in such a manner as to freely rotate around the carrier 27 via another planet gear element 34.

On the other hand, planet gear elements 37a, 37b are rotatably supported on a second carrier 36 provided around the sun gear 30b fixedly provided at the other end portion (the right end portion in FIG. 7) of the secondary transmission shaft 31. Note that the second carrier 36 is fixedly provided at a proximal end portion (a left end portion in FIG. 7) of an output shaft 38 which is disposed coaxially with the input shaft 1 and the secondary transmission shaft 31. In addition, the respective planet gear elements 37a, 37b mesh with each other, and one of the planet gear elements 37a meshes with the sun gear 30b, whereas the other planet gear element 37b meshes with a second ring gear 39 which is provided around the second carrier 36 in such a manner as to freely rotate therearound. Additionally, the ring gear 35 and the secondary carrier 36 are made to engage with and disengage from each other by a low-speed clutch 40, and the secondary ring gear 39 and a fixed portion such as a housing are made to engage with and disengage from each other by a high-speed clutch 41.

In the case of the continuously variable transmission apparatus shown in FIG. 7 which has been described heretofore, in a so-called low speed mode in which the low-speed clutch is engaged, whereas the high-speed clutch 41 is disengaged, the power of the input shaft 1 is transmitted to the output shaft 38 via the ring gear 35. Then, the transmission ratio of the whole continuously variable transmission unit, that is, the transmission ratio between the input shaft 1 and the output shaft 38 is changed by changing the transmission ratio of the toroidal-type continuously variable transmission unit 25. In the low-speed mode like this, the transmission ratio of the whole continuously variable transmission apparatus changes infinitely. Namely, by regulating the transmission ratio of the toroidal-type continuously variable transmission unit 25, with the input shaft 1 being kept rotating in one direction, the rotational state of the output shaft 38 can freely be converted from forward to backward rotations or vice versa with the stationary state being held therebetween.

During an acceleration in the low-speed mode like this or constant speed running, a torque (a passing torque) passing through the toroidal-type continuously variable transmission unit 25 is applied from the input shaft 1 to the output side disk 5a via the carrier 27 and the primary transmission shaft 29, the sun gear 33, and the hollow rotational shaft 32, and is then applied from this output side disk 5a to the respective input side disks 2, 2 via the respective power rollers 6, 6. Namely, the torque passing through the toroidal-type continuously variable transmission unit 25 during the acceleration or constant speed running of the engine circulates in a direction in which the respective input side disks 2, 2 receive the torque from the respective power rollers 6, 6.

In contrast to this, in a so-called high-speed mode in which the low-speed clutch 40 is disengaged, whereas the high-speed clutch 41 is engaged, the power of the input shaft 1 is transmitted to the output shaft 38 via the primary and secondary transmission shafts 29, 31. Then, the transmission ratio of the whole continuously variable transmission apparatus is changed by changing the transmission ratio of the toroidal-type continuously variable transmission unit 25. In this case, the greater the transmission ratio of the toroidal-type continuously variable transmission unit 25 becomes, the greater the transmission ratio of the whole continuously variable transmission apparatus becomes.

Note that a torque passing through the toroidal-type continuously variable transmission unit 25 during an acceleration in the high-speed mode like this or constant speed running is applied in a direction in which the respective input side disks 2, 2 apply the torque to the respective power rollers 6, 6.

For example, in the case of a continuously variable transmission apparatus which has the construction illustrated in FIG. 7 and which can realize a so-called infinite transmission ratio in which the output shaft 38 is stopped while the input shaft 1 is allowed to rotate, with a view to securing the durability of and ensuring the facilitation of operation of the toroidal-type continuously variable transmission unit 25, it is important to maintain a torque applied to the toroidal-type continuously variable transmission unit 25 at an appropriate value in a state in which the transmission ratio is extremely increased with a state being involved in which the output shaft 38 is stopped. This is because, as is clear from a relationship of "rotational driving force= rotational speed×torque", in a state in which the transmission ratio is extremely large and the output shaft 38 is stopped or rotates at extremely low speeds with the input shaft 1 being kept rotating, the torque (the passing torque) passing through the toroidal-type continuously variable transmission unit 25 becomes larger than a torque applied to the input shaft 1. Due to this, in order to secure the durability of the toroidal-type continuously variable transmission unit 25 without increasing the size thereof, there is produced a necessity of implementing a strict control to maintain the torque at the appropriate value as has been described above. To be specific, in order to stop the output shaft 38, while making the torque inputted into the input shaft 1 as small as possible, a control including the drive source is required.

In addition, in the state in which the transmission ratio is extremely large, even if the transmission ratio of the toroidal-type continuously variable transmission unit 25 changes slightly, the torque applied to the output shaft 38 changes largely. Due to this, unless the regulation of the transmission ratio of the toroidal-type continuously variable transmission unit 25 is implemented strictly, the driver possibly feels an abnormal feeling or the proper operation of the vehicle is possibly made difficult. For example, in the case of an automotive automatic transmission apparatus, a stationary state of the vehicle is maintained with a brake pedal being depressed by the driver. In this case, unless a strict regulation of the transmission ratio of the toroidal-type continuously variable transmission unit 25 is implemented and, as a result, a large torque is applied to the output shaft 38, a large effort to depress the brake pedal is required to stop the vehicle, whereby the driver is fatigued largely. On the contrary, unless a strict regulation of the transmission ratio of the toroidal-type continuously variable transmission unit 25 is implemented at the start of the vehicle, and, as a result, the torque applied to the output shaft 38 becomes too small, a smooth start of the vehicle is not possibly attained, or the vehicle is possibly reversed when attempted to be started upwardly from the rest on a slope. Consequently, when the vehicle is being stopped or is driving at extremely low speeds, not only does the torque that is transmitted from the drive source to the input shaft 1 need to be controlled, but also the regulation of the transmission ratio of the toroidal-type continuously variable transmission unit 25 needs to be implemented strictly.

In view of the points raised above, JP-A-10-103461 describes a construction which regulates a torque (a passing torque) passing through a toroidal-type continuously variable transmission unit by directly controlling a difference in pressure between hydraulic actuator portions for displacing trunnions.

In the case of the construction such as described in JP-A-10-3461, however, because the control is implemented based only on the difference in pressure, it is difficult to make the posture of the trunnion stationary at the moment the passing torque has matched a target value. Specifically speaking, since an amount in which the trunnion is displaced becomes large due to the control of the torque, a so-called overshoot (and, furthermore, a hunting in association with such an overshoot) tends to occur easily in which the trunnion does not stop at the moment the passing torque has matched the target value but continues to be displaced, and hence the control of the passing torque is not stabilized.

In particular, in the case of the toroidal-type continuously variable transmission unit 25 having no so-called cast angle such as the general half toroidal-type continuously variable transmission illustrated in FIGS. 4 to 6 in which the directions of the pivot shafts 9, 9 provided at the end portions of the trunnions 7, 7 and the direction of the central axis of the input and output side disks 2, 5 become normal to each other, the aforesaid overshoot is easy to occur. In contrast to this, in the case of a construction having the cast angle such as a general full toroidal-type continuously variable transmission unit, since a force is applied in a direction in which the overshoot is converged, even with the construction such as illustrated in JP-A-103461, it is considered that a sufficient torque control can be implemented.

In view of these situations, even with a continuously variable transmission apparatus which incorporates therein a toroidal-type continuously variable transmission unit having no cast angle such as the general half toroidal-type continuously variable transmission unit, an example of the construction of a continuously variable transmission apparatus is shown in FIG. 8 which can implement a strict control over a torque which passes through the toroidal-type continuously variable transmission. While the continuously variable transmission apparatus shown in FIG. 8 has a similar function to that of the conventionally known continuously variable transmission apparatus shown in FIG. 7, by devising the construction of the part thereof where the planet gear-type transmission 26a is provided, the assembling property of the part thereof where the planet gear-type transmission 26a is provided is improved.

Primary and secondary planetary gears 42, 43, which are of a double-pinion type, respectively, are supported, respectively, on sides of a carrier 27a which rotates together with an input shaft 1 and a pair of input side disks 2, 2. Namely, these primary and secondary planetary gears 42, 43 include a pair of planet gear elements 44a, 44b and a pair of planet gear elements 45a, 45b, respectively. Then, while the planet gear elements 44a and 44b, and 45a and 45b are made to mesh with each other, respectively, the radially inward planet gear elements 44a, 45a are made to mesh, respectively, with primary and secondary sun gears 47, 48 which are fixedly provided at a distal end portion (a right end portion in FIG. 8) of a hollow rotational shaft 32a which is connected to an output side disk 5a at a proximal end portion (a left end portion in FIG. 8) thereof and at one end portion (a left end portion in FIG. 8) of a transmission shaft 46, respectively, and the radially outward planet gear elements 44b, 45b are made to mesh with a ring gear 49, respectively.

On the other hand, planet gear elements 51a, 51b are rotatably supported on a secondary carrier 36a provided around a tertiary sun gear 50 fixedly provided at the other end portion (a right end portion in FIG. 8) of the transmission shaft 46. Note that this secondary carrier 36a is fixedly provided at a proximal end portion (a left end portion in FIG. 8) of an output shaft 38a disposed concentrically with the input shaft 1. In addition, while the respective planet gear elements 51a, 51b are made to mesh with each other, the radially inward planet gear element 51a is made to mesh with the tertiary sun gear 50, whereas the radially outward planet gear element 51b is made to mesh with a secondary ring gear 39a provided rotatably around the second carrier 36a. Additionally, the ring gear 49 and the secondary carrier 36a are freely engaged with and disengaged from each other via a low-speed clutch 40a, whereas the secondary ring gear 39a and a fixed portion such as a housing are engaged with and disengaged from each other via a high-speed clutch 41a.

In the case of the improved continuously variable transmission apparatus that is constructed as has been described above, in a state in which the low-speed clutch 40a is engaged, whereas the high-speed clutch 41a is disengaged, the power of the input shaft 1 is transmitted to the output shaft 38a via the ring gear 49. Then, by changing the transmission ratio of the toroidal-type continuously variable transmission unit 25, the speed ratio $e_{CVT}$ of the whole continuously variable transmission apparatus, that is, the speed ratio between the input shaft 1 and the output shaft 38a is changed. As this occurs, a relationship between the speed ratio $e_{CVU}$ of the toroidal-type continuously variable transmission unit 25 and the speed ratio $e_{CVT}$ of the whole continuously variable transmission apparatus will be expressed by the following expression (1), assuming that a ratio between the number of teeth $m_{49}$ of the ring gear 49 and the number of teeth $m_{47}$ of the primary sun gear 47 is $i_1$ (=$m_{49}/m_{47}$), $$e_{CVT}=(e_{CVU}+i_1-1)/i_1 \qquad (1)$$

Then, in the event that the ratio $i_1$ between the numbers of teeth of the ring gear 49 and the primary sun gear 47 is 2, a relationship between both the speed ratios $e_{CVU}$, $e_{CVT}$ changes as illustrated by a line segment α in FIG. 9.

In contrast to this, in a state in which the low-speed clutch 40a is disengaged, whereas the high-speed clutch 41a is engaged, the power of the input shaft 1 is transmitted to the output shaft 38a via the primary planetary gear 42, the ring gear 49, the secondary planetary gear 43, the transmission shaft 46, the planet gear elements 51a, 51b, and the secondary carrier 36a. Then, by changing the speed ratio $e_{CVU}$ of the toroidal-type continuously variable transmission unit 25, the speed ratio $e_{CVT}$ of the whole continuously variable transmission apparatus is changed. As this occurs, a relationship between the speed ratio $e_{CVU}$ of the toroidal-type continuously variable transmission unit 25 and the speed ratio $e_{CVT}$ of the whole continuously variable transmission apparatus will be expressed by the following expression (2). Note that, in this expression (2), $i_1$ denotes a ratio ($m_{49}/m_{47}$) between the number of teeth $m_{49}$ of the ring gear and the number of teeth $m_{47}$ of the primary sun gear 47, $i_2$ denotes a ratio ($m_{49}/m_{48}$) between the number of teeth $m_{49}$ of the ring gear 49 and the number of teeth $m_{48}$ of the secondary sun gear 48, and $i_3$ denotes a ratio ($m_{39}/m_{50}$) between the number of teeth $m_{39}$ of the secondary ring gear 39a and the number of teeth $m_{50}$ of the tertiary sun gear 50, respectively.

$$e_{CVT}=\{1/(1-i_3)\}\cdot\{1+(i_2/i_1)(e_{CVU}-1)\} \qquad (2)$$

Then, in the event that, of these ratios, $i_1$ is 2, $i_2$ is 2.2, and $i_3$ is 2.8, the relationship between the speed ratios $e_{CVU}$, $e_{CVT}$ changes as illustrated by a segment line β in FIG. 9.

In the case of the continuously variable transmission apparatus which is constructed and which functions as has been described above, as is clear from the segment line α in FIG. 9, a so-called infinite transmission ratio state is created in which the output shaft 38a is stopped while allowing the input shaft 1 to rotate. However, in the state like this in which the output shaft 38a is stopped or is allowed to rotate at extremely low speeds with the input shaft 1 being kept rotating, as has been described previously, the torque (the passing torque) passing through the toroidal-type continuously variable transmission unit 25 becomes larger than a torque that is applied from the engine which is the drive source to the input shaft 1. Due to this, when the vehicle is stationary or drives at extremely low speeds, the torque that is inputted from the drive source to the input shaft 1 needs to be regulated strictly so that the passing torque becomes too large (or too small).

In addition, during the driving at extremely low speeds, in a state close to the state in which the output shaft 38a is stopped, that is, a state in which the transmission ratio of the continuously variable transmission is very large and the rotational speed of the input shaft 38a is largely slow when compared with the rotational speed of the input shaft 1, a slight variation in transmission ratio of the continuously variable transmission apparatus largely varies a torque that is applied to the output shaft 38a. Due to this, in order to ensure a smooth driving operation, the torque that is inputted from the drive source to the input shaft 1 also needs to be regulated properly.

In addition, during an acceleration in the low-speed mode like this or constant speed running, as with the conventional structure shown in FIG. 7, the passing torque is applied from the input shaft 1 to the output side disk 5a via the carrier 27a and the primary planetary gear 42, the primary sun gear 47, and the hollow rotational shaft 32a, and is then applied from this output side disk 5a to the respective input side disks 2, 2 via the respective power rollers 6, 6 (refer to FIG. 7). Namely, during the acceleration or constant speed running, the passing torque circulates in a direction in which the respective input side disks 2, 2 receive the torque from the respective power rollers 6, 6.

Due to this, according to a method and apparatus for controlling the transmission ratio by the aforesaid structure, the torque that is inputted from the drive source to the input shaft 1 is designed to be regulated properly as illustrated in FIG. 10. Firstly, the rotational speed of the engine which is the drive source is controlled roughly. Namely, the rotational speed of the engine is regulated to a point a within a range w in FIG. 10. In conjunction with this, a transmission ratio of the toroidal-type continuously variable transmission unit 25 is set which is understood to be required so that the rotational speed of the input shaft 1 of the continuously variable transmission apparatus coincides with the controlled rotational speed of the engine. This setting job is implemented based on the aforesaid expression (1). Namely, it is when the so-called low-speed mode in which the low-speed clutch 40a is engaged, whereas the high-speed clutch 41a is disengaged is applied that the torque that is transmitted from the engine to the input shaft 1 is strictly controlled by the method above. Consequently, the transmission ratio of the toroidal-type continuously variable transmission unit 25 is set by the expression (1) above so that the rotational speed of the input shaft 1 become a value which corresponds to the required rotational speed of the output shaft 38a.

In addition, differences in pressure between pairs of hydraulic pressure chambers 24a, 24b (refer to FIGS. 6, 12) which constitute hydraulic actuators 10, 10 for displacing trunnions 7, 7 disposed in the toroidal-type continuously variable transmission unit 25 in axial directions of pivot shafts 9, 9 are measured by a hydraulic pressure sensor 52 (refer to FIG. 2 that will be described later on). This hydraulic pressure measuring job is performed in a state in which the rotational speed of the engine is roughly controlled (however, the rotational speed should be maintained constant) and in accordance with this, the transmission ratio of the toroidal-type continuously variable transmission unit 25 is set based on the expression (1) as has been described above. Then, a torque (a passing torque) that passes through the toroidal-type continuously variable transmission unit 25 is calculated from differences in pressure so obtained based on the measuring job.

Namely, since the differences in pressure are proportional to a torque $T_{CVU}$ that passes through the toroidal-type continuously variable transmission unit 25 as long as the transmission ratio of the toroidal-type continuously variable transmission unit 25 remains constant, this torque $T_{CVU}$ can be obtained from the differences in pressure. As has been described previously, this is because the respective actuators 10, 10 bear the force of 2 Ft that has a magnitude proportional to a torque (=a torque $T_{CVU}$ that passes through the toroidal-type continuously variable transmission unit 25) that is transmitted from the input side disks 2, 2 to the output side disk 5a (or from the output side disk 5a to the input side disks 2, 2).

On the other hand, the torque $T_{CVU}$ is also obtained by the following expression (3).

$$T_{CVU}=e_{CVU} \cdot T_{IN}/(e_{CVU}+(i_1-1) \eta_{CVU}) \quad (3)$$

In this expression (3), $e_{CVU}$ denotes the transmission ratio of the toroidal-type continuously variable transmission unit 25, $T_{IN}$ denotes a torque that is inputted from the engine to the input shaft 1, $i_1$ denotes a ratio of numbers of teeth (a ratio between the number of teeth $m_{49}$ of the ring gear 49 and the number of teeth $m_{47}$ of the primary sun gear 47) of the planetary gear transmission unit for the primary planetary gear 42, and $\eta_{CVU}$ denotes the efficiency of the toroidal-type continuously variable transmission unit 25, respectively.

Then, a deviation $\Delta T$ (=$T_{CVU1}-T_{CVU2}$) between a torque $T_{CVU1}$ actually passing through the toroidal-type continuously variable transmission unit 25 which is obtained from the difference in pressure and a target passing torque $T_{CVU2}$ which is obtained from the expression (3) is obtained based on the actual passing torque $T_{CVU1}$ and the target value $T_{CVU2}$. Then, the speed ratio of the toroidal-type continuously variable transmission unit 25 is regulated in a direction that cancels the deviation $\Delta T$ ($\Delta T=0$). Note that since the deviation $\Delta T$ between the torques and a deviation between the differences in pressure are in a proportional relation, the transmission ratio regulating job can be performed by either of the deviation between the pressures and the deviation between the differences in pressure. Namely, from the technical perspective, the transmission ratio control through the torque deviation is identical with the transmission ratio control through the differences-in-pressure deviation.

For example, a case is considered in which the torque $T_{IN}$ with which the engine drives the input shaft 1 drastically changes to rapidly decrease as the rotational speed of the input shaft 1 increases in the area where the torque $T_{CVU1}$ (the measured value) that actually passes through the toroidal-type continuously variable transmission unit 25 is regulated to the target value $T_{CVU2}$ as shown in FIG. 10. The property of the engine like this can easily be obtained even in a low rotational speed area provided that the engine is electronically controlled. In the event that, with the engine having such an engine property, when compared with the target value $T_{CVU2}$, the measured value $T_{CVU1}$ of the torque has similarly a deviation in a direction in which the respective input side disks 2, 2 receive the torque from the respective power rollers 6, 6 (refer to FIGS. 5 to 7), the transmission ratio of the whole continuously variable transmission apparatus is displaced towards the reduce-speed side in order to increase the rotational speed of the engine to decrease the torque $T_{IN}$ with which the input shaft 1 is driven. Due to this, the speed ratio of the toroidal-type continuously variable transmission unit 25 is changed to the increase-speed side.

However, in a state in which the vehicle is stopped with the brake pedal being depressed (the rotational speed of the output shaft=0), the control of the speed ratio of the toroidal-type continuously variable transmission unit 25 is implemented within a range where the change in speed ratio can be absorbed by a slip generated in the interior of the toroidal-type continuously variable transmission unit 25, or a slip generated at the abutment portions (traction portions) between the inner surfaces of the input and output side disks 2, 5$a$ and the circumferential surfaces of the respective power rollers 6, 6 (refer to FIGS. 5 to 7). Consequently, a permissible range where the speed ratio can be regulated is limited to a range where no unbearable force is applied to the abutment portions, and hence, when compared with the low-speed running case, the permissible range becomes limited.

For example, in the event that, with the target value $T_{CVU2}$ existing at the point a in FIG. 10, the measured value $T_{CVU1}$ exists at a point b in the same figure, it indicates the existence of a state in which the measured value $T_{CVU1}$ has the deviation in the direction in which the respective input side disks 2, 2 receive the torque from the respective power rollers 6, 6. Then, the speed ratio $e_{CVU}$ of the toroidal-type continuously variable transmission unit 25 is changed to the increase-speed side, so that the speed ratio $e_{CVT}$ of the whole continuously variable transmission apparatus (T/M) is changed to the reduce-speed side. In association with this, the rotational speed of the engine is increased so as to decrease the torque thereof. On the contrary, in the event that the measured value $T_{CVU1}$ exists at a point c in the same figure, it indicates the existence of a state in which the measured value $T_{CVU1}$ has a deviation in a direction in which the respective input side disks 2, 2 apply the torque to the respective power rollers 6, 6. In this case, on the contrary to the case described above, the speed ratio $e_{CVU}$ of the toroidal-type continuously variable transmission unit 25 is changed to the reduce-speed side, so that the speed ratio $e_{CVT}$ of the whole continuously variable transmission apparatus (T/M) is changed to the increase-speed side. In association with this, the rotational speed of the engine is decreased so as to increase the torque thereof.

Thus, the operations that have been described above are repeatedly performed until the torque $T_{CVU1}$ passing through the toroidal-type continuously variable transmission unit 25 that is obtained from the differences in pressure coincides with the target value. Namely, in the event that the torque $T_{CVU1}$ passing through the toroidal-type continuously variable transmission unit 25 cannot be made to coincide with the target value through a single control of the transmission ratio of the toroidal-type continuously variable transmission unit 25, the operations mentioned above will be carried out repeatedly. As a result, the torque $T_{IN}$ with which the engine rotatably drives the input shaft 1 can be made to approach a value which makes the torque $T_{CVU1}$ passing through the toroidal-type continuously variable transmission unit 25 coincide with the target value $T_{CVU2}$. Note that these operations are implemented automatically and within a short period of time by commands from a microcomputer incorporated in a control unit for the continuously variable transmission apparatus.

In addition, FIG. 11 shows relations among a ratio (a left-hand side axis of ordinate) between the torque $T_{CVU}$ passing through the toroidal-type continuously variable transmission unit 25 and the torque $T_{IN}$ with which the engine rotatably drives the input shaft 1 the speed ratio $e_{CVT}$ (a right-hand side axis of ordinate) of the whole continuously variable transmission apparatus and the speed ratio $e_{CVU}$ (an axis of abscissa) of the toroidal-type continuously variable transmission unit 25. A solid line a denotes a relation between the ratio of the passing torque $T_{CVU}$ and the driving torque $T_{IN}$ and the speed ratio $e_{CVT}$ of the whole continuously variable transmission apparatus and a broken line b denotes a relation between both the speed ratios $e_{CVT}$, $e_{CVU}$, respectively. According to this construction, with the speed ratio $e_{CVT}$ of the whole continuously variable transmission apparatus being regulated to a predetermined value, the speed ratio $e_{CVU}$ of the toroidal-type continuously variable transmission unit 25 is regulated so that the torque $T_{CVU1}$ which passes through the toroidal-type continuously variable transmission unit 25 is regulated to a target value ($T_{CVU2}$) which is represented by a point on the solid line a.

In the case of the aforesaid construction, as has been described above, a control for regulation of the torque $T_{CVU1}$ which actually passes through the toroidal-type continuously variable transmission unit 25 to the point on the solid line a which is the target value $T_{CVU2}$ is implemented in two stages; that is, by roughly controlling the rotational speed of the engine or controlling the rotational speed of the engine to a rotational speed where the target value $T_{CVU2}$ is likely to be obtained, and thereafter by controlling the transmission ratio of the toroidal-type continuously variable transmission unit 25 in accordance with the rotational speed so controlled. Due to this, the torque $T_{CVU1}$ which actually passes through the toroidal-type continuously variable transmission unit 25 can be regulated to the target value $T_{CVU2}$ without causing an overshoot (and a hunting in association therewith) that is inherent in the conventional methods, or with an overshoot (and a hunting in association therewith) being suppressed to a low level that causes no practical problem, in case the occurrence of overshoot and hunting in association therewith cannot be avoided.

In addition, as has been described before, with the vehicle being stopped by depressing the brake pedal, a driving force (torque) is applied to the output shaft 38$a$ (FIG. 8) based on the slip generated in the interior of the toroidal-type continuously variable transmission unit 25. It is considered that the magnitude of the torque is set to a value which matches a creeping force that is generated in a general automatic transmission apparatus provided with a conventionally propagated torque converter. This is because drivers who are accustomed to operating the general automatic transmission apparatus can avoid having to feel an abnormal feeling. In addition, the direction of the torque is determined by operating positions of an operation lever provided in the vicinity of the driver's seat. When the operation lever selects a forward position (a D range), the torque is applied to the output shaft 38$a$ in a forward direction, whereas when the operation lever selects a reverse position (an R range), the torque is applied to the output shaft 38$a$ in a reverse direction.

Next, a circuit for controlling the speed ratio of the toroidal-type continuously variable transmission unit 25 so that the torque $T_{CVU1}$ that actually passes through the toroidal-type continuously variable transmission unit 25 coincides with the target value $T_{CVU2}$ will be described by reference to FIG. 12.

A hydraulic fluid is freely supplied to or discharged from the pair of hydraulic pressure chambers 24$a$, 24$b$ which constitute the hydraulic actuator 10 for displacing the trunnion 7 in axial directions (in vertical directions in FIG. 12) of the pivot shafts 9, 9 (refer to FIG. 6) through a control valve 12. A sleeve 14 which constitutes the control valve 12 is adapted to be freely displaced in axial directions by a stepping motor 13 via a rod 53 and a link arm 54. In addition, a spool 15 which constitutes the control valve 12 is brought into engagement with the trunnion 7 via a link arm 19, a precess cam 18 and a rod 17 and is adapted to be freely displaced in the axial directions in association with the axial displacement and the swinging displacement of the trunnion 7. This construction is basically the same as that of a control mechanism for controlling the transmission ratio of the toroidal-type continuously variable transmission unit that has been conventionally known.

In particular, with the above construction, the sleeve 14 is, in addition to being driven by the stepping motor 13, driven by a hydraulic differential pressure cylinder 55, as well. Namely, a distal end portion of the rod 53 connected to a proximal end portion of the sleeve 14 is pivotally supported on an intermediate portion of the link arm 54, and pins that are provided at output portions of the stepping motor 13 and the differential pressure cylinder 55 are brought into engagement with elongate holes formed in both end portions of the link arm 54, respectively. In the event that the pin in the elongate hole formed in one end portion of the link arm 54 is pushed and pulled, the pin in the elongate hole in the other end portion of the link arm 54 constitutes a fulcrum. According to this construction, the sleeve 14 is adapted to be displaced axially not only by the stepping motor 13 but also by the differential pressure cylinder 55. In the construction, the speed ratio $e_{CVU}$ of the toroidal-type continuously variable transmission unit 25 is designed to be regulated according to the torque $T_{CVU}$ that passes through the toroidal-type continuously variable transmission unit 25 through the displacement of the sleeve 14 by the differential pressure cylinder 55. With the above construction, the speed ratio $e_{CVU}$ of the toroidal-type continuously variable transmission unit 25 is designed to be regulated through the displacement of the sleeve 14 by the differential pressure cylinder 55 according to the torque $T_{CVU}$ that passes through the toroidal-type continuously variable transmission unit 25.

Due to this, with the construction, hydraulic pressures which are different from each other are designed to be freely introduced into a pair of hydraulic pressure chambers 56a, 56b provided in the differential pressure cylinder 55 through a compensating control valve 57. Hydraulic pressures that are introduced into the respective hydraulic pressure chambers 56a, 56b are determined based on a differential pressure $\Delta P$ between hydraulic pressures $P_{DOWN}$, $P_{UP}$ which are applied to the interiors of the pair of hydraulic pressure chambers 24a, 24b which constitute the actuator 10 and a differential pressure $\Delta Po$ between output pressures of a pair of electromagnetic valves 58a, 58b which are adapted for regulating the opening of the compensating control valve 57. Namely, the opening and closing of both the electromagnetic valves 58a, 58b is operated by a controller, not shown, such that the differential pressure $\Delta Po$ between the output pressures of both the electromagnetic valves 58a, 58b becomes a target differential pressure which corresponds to the target torque $T_{CVU2}$ of the toroidal-type continuously variable transmission unit 25 and is controlled based on output signals outputted from this control unit. Consequently, a force corresponding to the differential pressure $\Delta P$ between the hydraulic pressures applied to the interiors of the hydraulic pressure chambers 24a, 24b of the actuator 10 and a force opposing the force, that is, the differential pressure $\Delta Po$ between the output pressures of the electromagnetic valves 58a, 58b which is the target differential pressure which corresponds to the target torque $T_{CVU2}$ are applied to a spool 59 which constitutes the compensating control valve 57.

In the event that the torque $T_{CVU1}$ that actually passes through the toroidal-type continuously variable transmission unit 25 coincides with the target torque $T_{CVU2}$, that is, in the event that a difference $\Delta T$ between the passing torque $T_{CVU1}$ and the target torque $T_{CVU2}$ is 0, the force corresponding to the differential pressure $\Delta P$ between the hydraulic pressures applied to the interiors of the hydraulic pressure chambers 24a, 24b of the actuator 10 and the force corresponding to the differential pressure $\Delta Po$ between the output pressures of the electromagnetic valves 58a, 58b balance with each other. Due to this, the spool 59 which constitutes the compensating control valve 57 is positioned at an intermediate position, the pressures applied to the hydraulic pressure chambers 56a, 56b of the differential pressure chamber 55 become equal. In this state, a spool 60 of the differential pressure cylinder 55 is positioned at an intermediate position, and the transmission ratio of the toroidal-type continuously variable transmission unit 25 remains unchanged (no compensation is implemented).

On the other hand, in the event that there is caused a difference between the torque $T_{CVU1}$ that actually passes through the toroidal-type continuously variable transmission unit 25 coincides and the target torque $T_{CVU2}$, the balance is broken between the force corresponding to the differential pressure $\Delta P$ between the hydraulic pressures applied to the interiors of the hydraulic pressure chambers 24a, 24b of the actuator 10 and the force corresponding to the differential pressure $\Delta Po$ between the output pressures of the electromagnetic valves 58a, 58b. Then, the spool 59 which constitutes the compensating control valve 57 is displaced axially according to the magnitude and direction of the difference $\Delta T$ between the passing torque $T_{CVU1}$ and the target torque $T_{CVU2}$, and an appropriate hydraulic pressure corresponding the magnitude and direction of the difference $\Delta T$ is then introduced into the interiors of the hydraulic pressure chambers 56a, 56b of the differential pressure cylinder 55. Then, the spool 60 of the differential pressure cylinder 55 is displaced axially, and in conjunction with this, the sleeve 14 which constitutes the control valve 12 is displaced axially. As a result, the trunnion 7 is displaced in the axial direction of the pivot shafts 9, 9, whereby the speed ratio of the toroidal-type continuously variable transmission unit 25 is changed (a compensation is implemented). Note that the direction and amount in which the transmission ratio is changed as has been described above are as has been described with respect to FIGS. 10 to 11. In addition, the amount in which the speed ratio of the toroidal-type continuously variable transmission unit 25 is changed as has been described above, or the amount in which the speed ratio thereof is compensated (the compensation amount of speed ratio) is sufficiently small relative to the width of the speed ratio of the toroidal-type continuously variable transmission unit 25. Due to this, the stroke of the spool 60 of the differential pressure cylinder 55 is made sufficiently smaller than the stroke of the output portion of the stepping motor 13.

With the continuously variable transmission apparatus that has been constructed as has been described above, when the vehicle is being stopped or is driving at extremely low speeds, it is possible to strictly regulate the speed ratio of the toroidal-type continuously variable transmission unit incorporated in the continuously variable transmission apparatus. However, in order to enable the implementation of a highly accurate control at low cost so as to realize a running condition which makes the driver feel no abnormal feeling, it has to be designed such that the rotational speed of the output shaft 38, 38a is obtained by inexpensive sensors. For example, it is preferred that the torque applied to the drive wheels at the time of so-called creep driving in which the vehicle is driven at extremely low speeds with both the acceleration and brake pedals being released is such that the torque is made to become larger (maximum) with the vehicle being stationary, whereas the torque is made to drastically decrease as the vehicle speed increases. Furthermore, in a state in which, while the vehicle is being stopped on a climbing up slope, the vehicle is forced to be reversed due to an insufficient torque being applied to the drive wheels, it is preferred that on detecting a low-speed rotation of the output shaft 38, 38a in a reverse direction, the torque transmitted from the output shaft 38, 38a to the drive wheels be increased.

While the continuously variable transmission apparatus that is constructed as has been described above is such as to satisfy the aforesaid demand, in order to make that happen, the rotational speed of the output shaft 38, 38a while rotating at extremely low speeds or the stationary state thereof has to be grasped with accuracy. However, a rotation sensor which can grasp the rotational speed of the output shaft 38, 38a while rotating at extremely low speeds or the stationary state thereof with accuracy increases the costs. A so-called active-type rotation sensor is known in which magnetism detection elements such as hall elements and magnetic resistance elements are combined with a permanent magnet, but the rotation sensor of the type is expensive. Further, in a case of that rotational speed is extremely low, it can not be avoided that an response is slow. In contrast to this, since a so-called passive-type rotation sensor is more inexpensive than the active-type rotation sensor in which an electric current which changes in a sine-wave-like fashion is induced in a coil wound around the periphery of a pole piece through which magnetic flux generated from a permanent magnet is conducted, when it is incorporated in the continuously variable transmission apparatus, the attainment of a reduction in cost can be attempted. However, with the passive-type rotation sensor, in case the rotation speed of a portion to be detected is slow, the voltage of electric current induced in the coil becomes low, and the rotation speed of the relevant portion cannot be detected.

Consequently, the passive-type rotation sensor is not appropriate for the rotational speed detection sensor for the output shaft 38, 38a of the continuously variable transmission apparatus. In addition, not only with this passive-type rotation sensor but also with the active-type rotation sensor, neither of them can solely identify the rotational direction of the portion being detected. Due to this, the reverse movement of the automotive vehicle on the climbing up slope that has been described previously cannot be identified. While, with a plurality of rotational sensors being combined together, such a movement can be identified, increases in costs and installation space cannot be avoided.

SUMMARY OF THE INVENTION

A continuously variable transmission apparatus according to the invention was invented in view of these situations.

With a view to solving the problems, according to a first aspect of the invention, there is proposed a continuously variable transmission apparatus having an input shaft, an output shaft, a toroidal-type continuously variable transmission unit, a gear-type differential unit in combination with a plurality of gears, and a control unit for controlling a change in transmission ratio of the toroidal-type continuously variable transmission unit, wherein the toroidal-type continuously variable transmission unit has; an input side disk rotatably driven by the input shaft, an output side disk supported coaxially with the input side disk and rotatably relative to the input side disk, a plurality of power rollers interposed between the input side disk and the output side disk, an input side rotation sensor for measuring a rotational speed of the input side disk, and an output side rotation sensor for measuring a rotational speed of the output side disk, wherein the differential unit has; a first input portion rotated together with the input side disk by the input shaft, and a second input portion connected to the output side disk, whereby a rotation according to a difference in speed between the first and second input portions is taken to be transmitted to the output shaft, and wherein the control unit regulates the transmission ratio of the toroidal-type continuously variable transmission unit so as to change relative speeds of the plurality of gears constituting the differential unit to thereby convert the rotational state of the output shaft to forward and backward rotations with a stationary state being interposed therebetween with the input shaft being kept rotating in one direction, and to calculate a rotational speed of the output shaft based on a rotational speed of the input side disk obtained by the input side rotation sensor and a rotational speed of the output side disk obtained by the output side rotation sensor, and a gear ratio of the differential unit.

According to a second aspect of the invention, there is proposed a continuously variable transmission apparatus asset forth in the first aspect of the invention, wherein the control unit further regulates a torque which passes through the toroidal-type continuously variable transmission unit to be transmitted to the output shaft according to the rotational speed of the output shaft so calculated by changing the gear ratio of the toroidal-type continuously variable transmission unit.

With the continuously variable transmission apparatus that is constructed as has been described above, even if relatively inexpensive rotation sensors are used, the rotational speed and direction of the output shaft which is rotating at low speeds or is in a stationary state can be identified. Namely, the rotational speed and direction of the output shaft can be obtained from the rotational speeds of the input and the output side disks of the toroidal-type continuously variable transmission unit and the gear ratio (the ratio of numbers of teeth) of the differential unit through calculation. In addition, the input and output side disks rotate at far faster speeds than the output shaft even in the state in which the output shaft rotates at low speeds or is stationary. Consequently, even with the relatively inexpensive rotation sensors, the rotational speeds of the input and output side disks can be measured with accuracy, thereby making it possible to identify the rotation speed and rotation direction of the output shaft with accuracy.

DETAILED DESCRIPTION OF THE PREFERRED EMBODIMENTS

Figure 1:
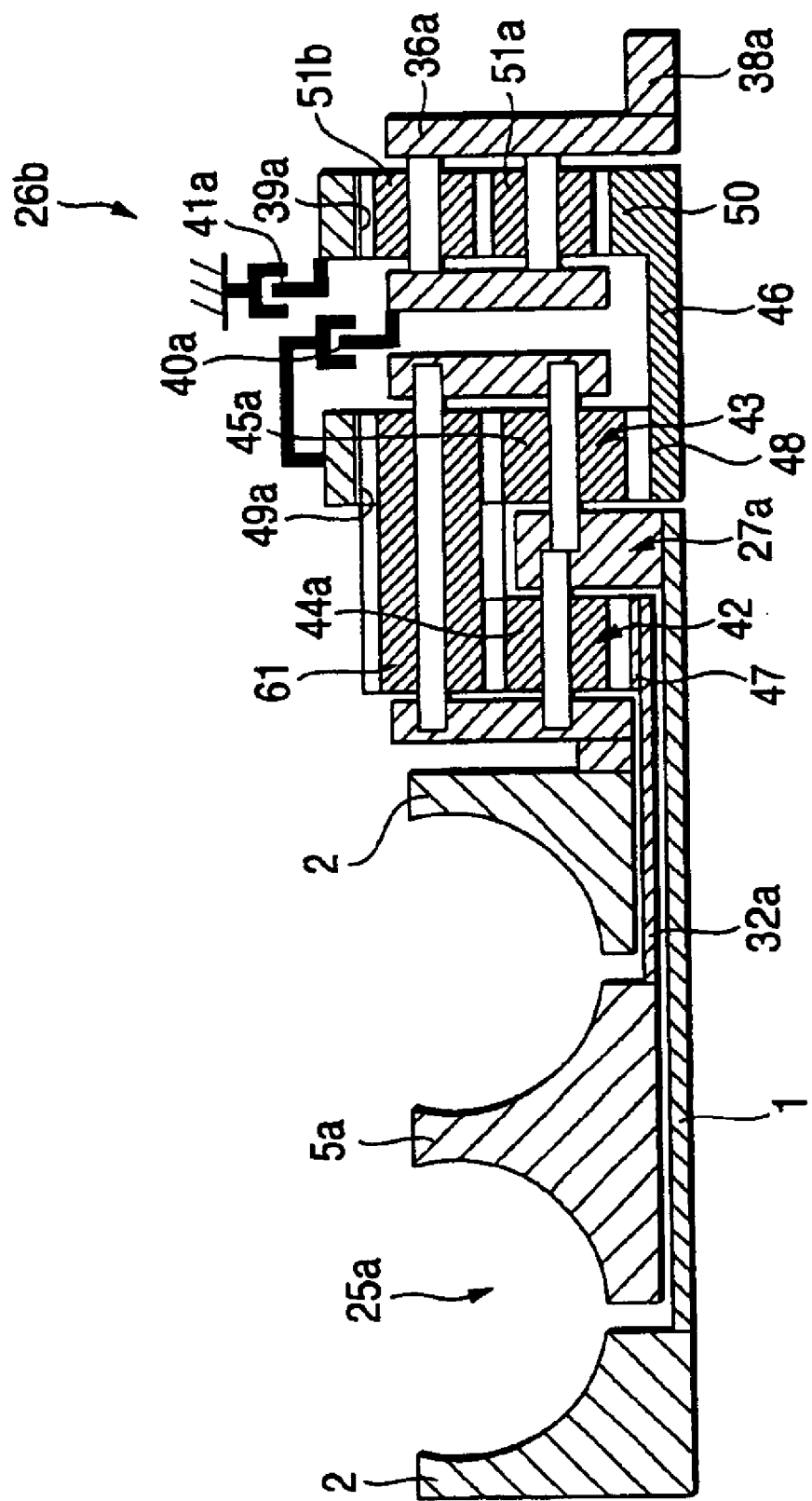
FIG. 1 is a schematic cross-sectional view showing a half part of a continuously variable transmission apparatus, which illustrates an embodiment of the invention.
Figure 2:
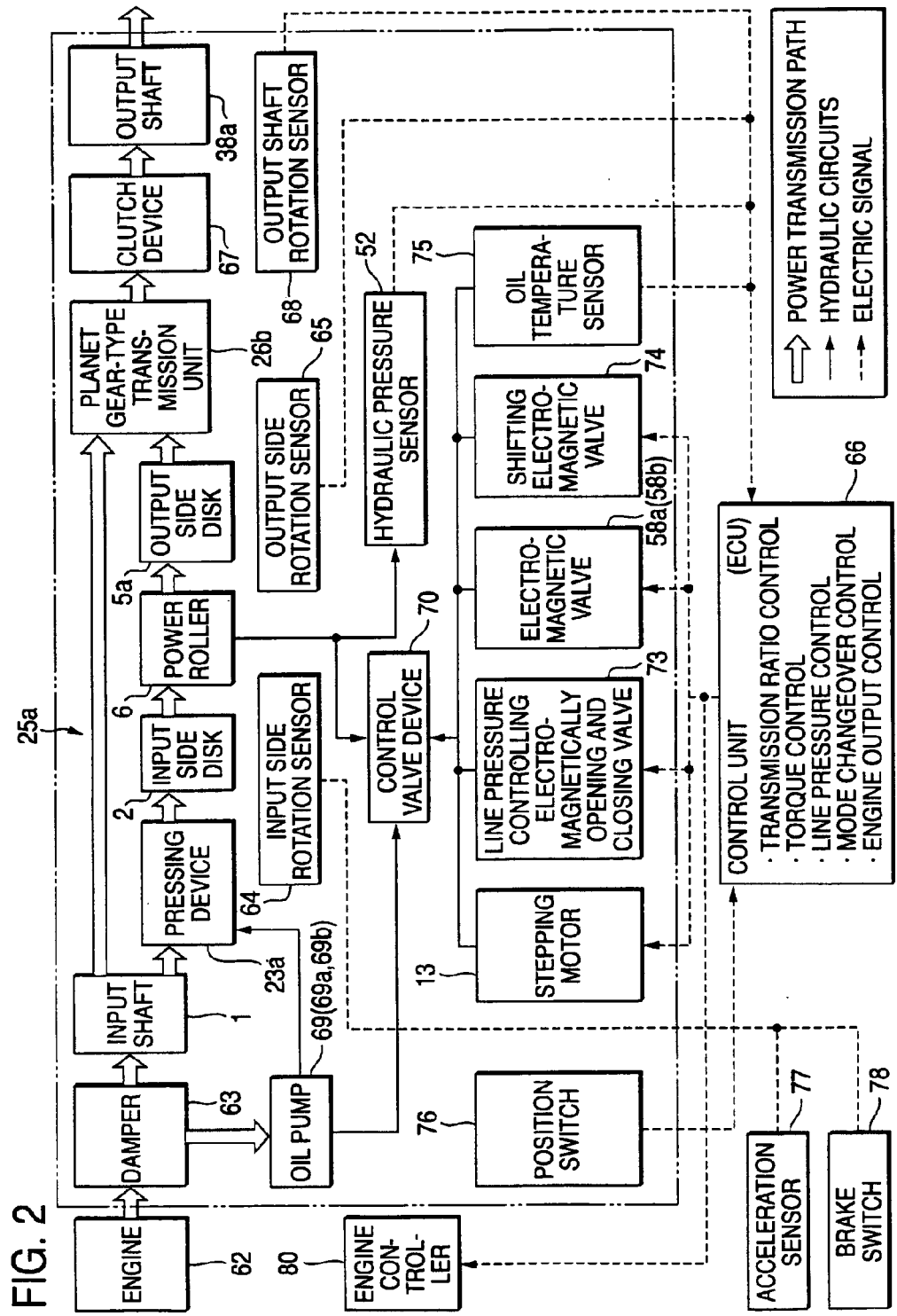
FIG. 2 is a block diagram of a transmission ratio control system according to the embodiment of the invention.
Figure 3:
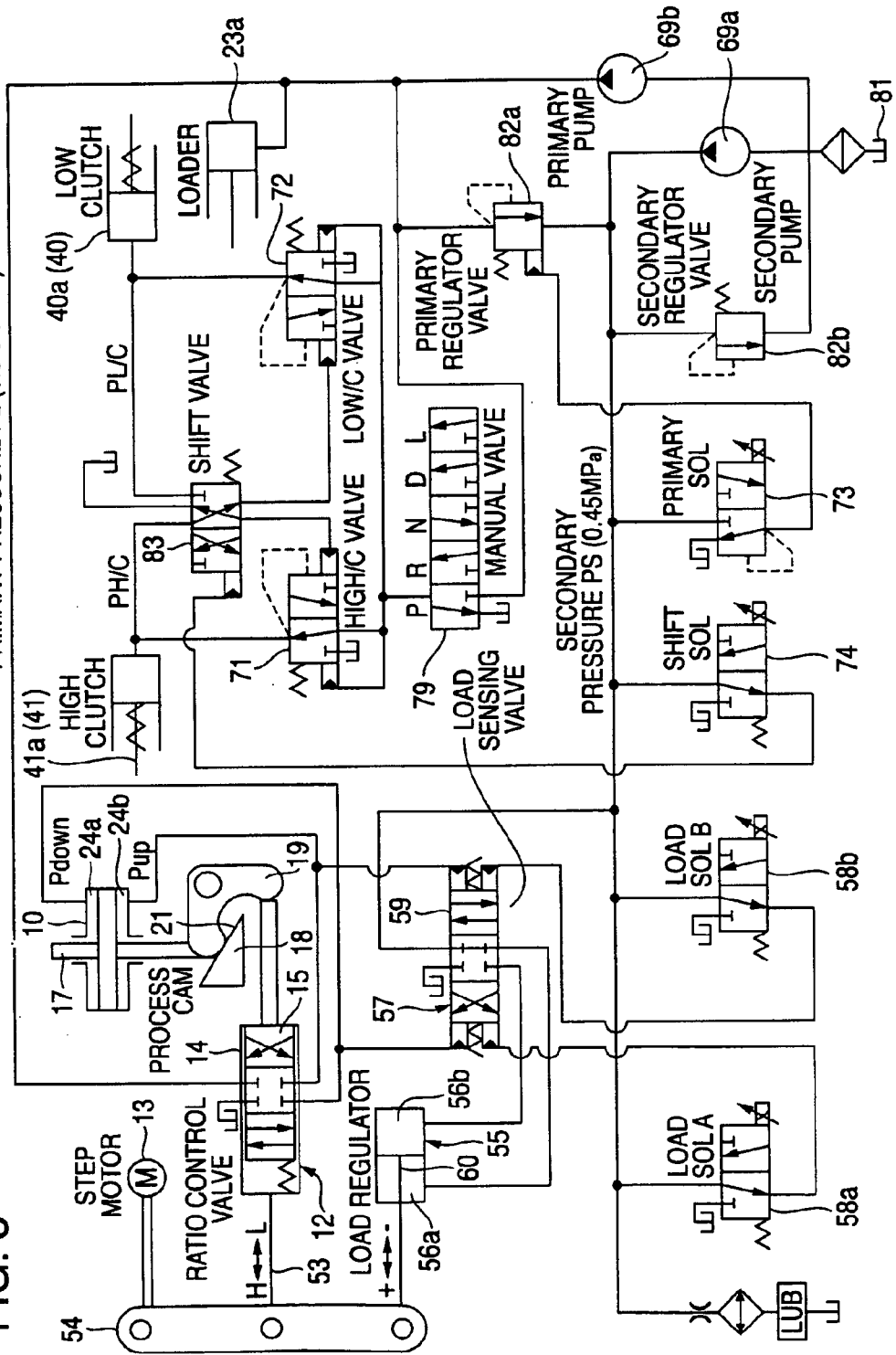
FIG. 3 is a hydraulic circuit diagram showing a mechanism for regulating the transmission ratio of a toroidal-type continuously variable transmission unit incorporated in the continuously variable transmission apparatus.
Figure 4:
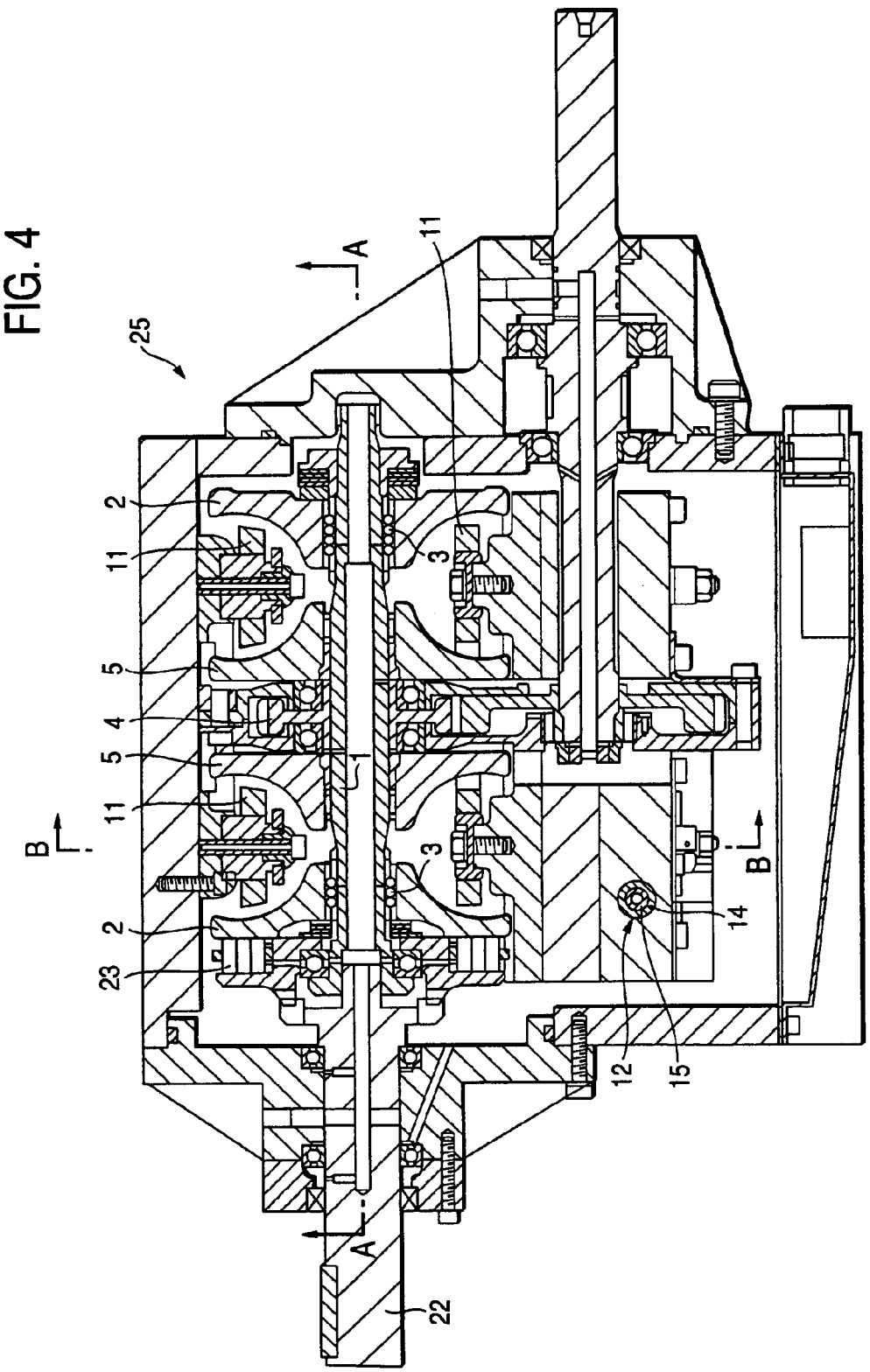
FIG. 4 is a cross-sectional view illustration an example of a conventionally known toroidal-type continuously variable transmission unit.
Figure 5:
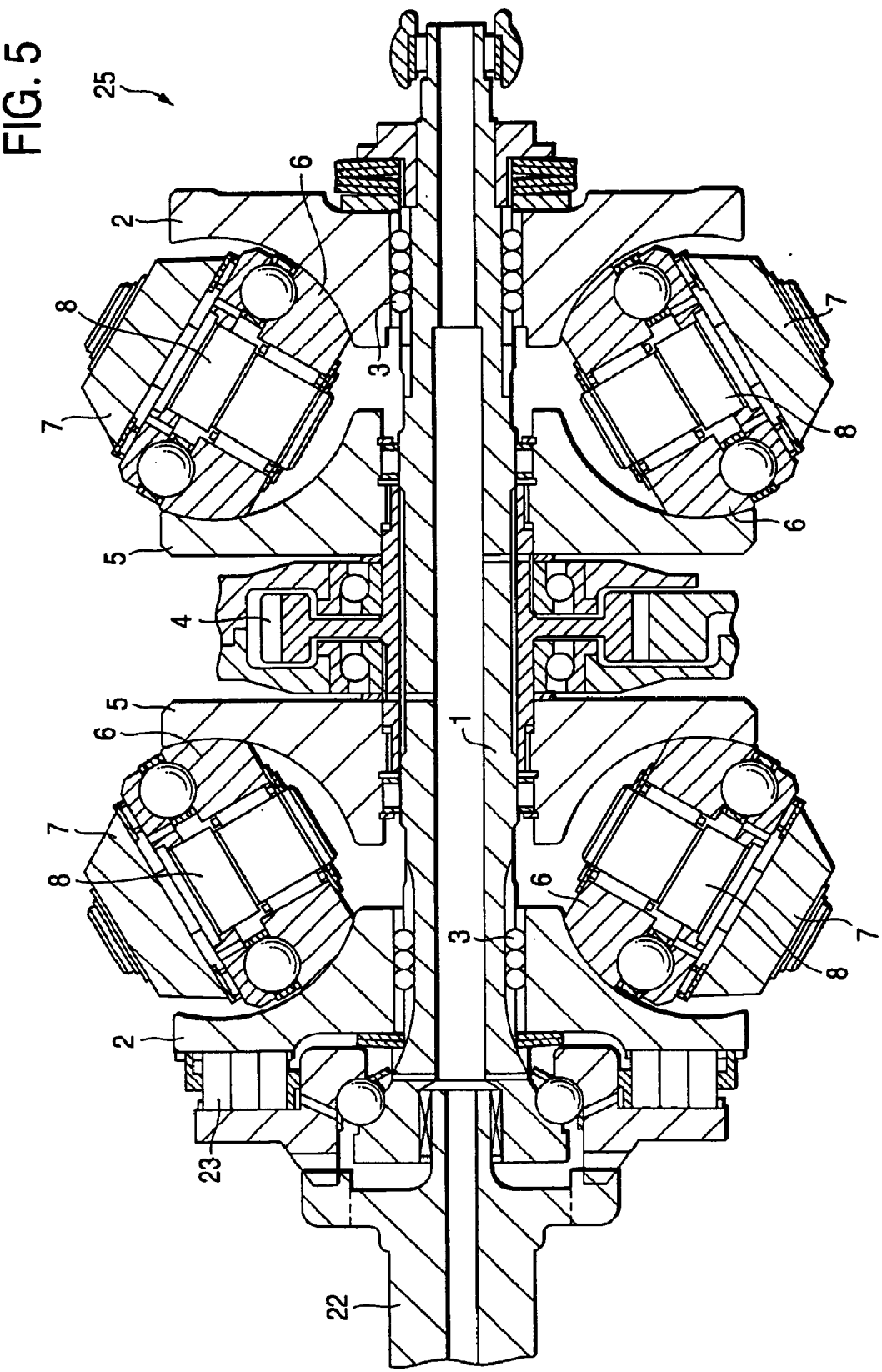
FIG. 5 is a cross-sectional view taken along the line A—A in FIG. 4.

FIGS. 1 to 3 illustrate an embodiment of the invention. FIG. 1 illustrates an embodiment of a continuously variable transmission apparatus including, in combination, a toroidal-type continuously variable transmission unit 25*a* and a planet gear-type transmission unit 26*b*. The construction of this continuously variable transmission system is basically identical with those of the conventional continuously variable transmission apparatus shown in FIG. 7 or the continuously variable transmission apparatus shown in FIG. 8 that has been described above as the improvement over the one shown in FIG. 7. In particular, in the continuously variable transmission apparatus according to the embodiment, of respective planet gear elements which constitute primary and secondary planetary gears 42, 43 of the planet gear-type transmission unit 26*b*, an axially elongate planet gear element is used as a planet gear element 61 which is provided radially outwardly. Then, this planet gear element 61 is made to mesh with respective planet gear elements 44*a*, 45*a* which are provided radially inwardly. In addition, a ring gear having a smaller width is used as a ring gear 49 which meshes with the planet gear element 61. According to the construction illustrated in FIG. 1, by reducing the axial dimension of the ring gear 49 having a large diameter so as to decrease the volume thereof, the weight of the continuously variable transmission apparatus can be attempted to be decreased. The function of the continuously variable transmission apparatus is identical with that of the conventional continuously variable transmission apparatus illustrated in FIG. 7 or the one constructed as illustrated in FIG. 8.

Next, on the premise of what is illustrated in FIG. 1, the continuously variable transmission apparatus according to the embodiment will be described by reference to a block diagram of FIG. 2. In FIG. 2, thick arrows, solid lines and broken lines denote power transmission paths; hydraulic circuits, and electric circuits, respectively. An output from an engine 62 is inputted into an input shaft 1 via damper 63. The damper 63 has a function as an elastic joint for smoothing the rotation of the engine 62 so as to be transmitted to the input shaft 1. Note that a feature of the invention resides in the accurate measurement of the rotational speed and rotational direction of an output shaft 38*a* while a vehicle runs at extremely low speeds or is stopped in order to strictly control a torque which passes through the toroidal-type continuously variable transmission unit 25*a* to be applied to the output shaft 38*a*. Since the construction of the continuously variable transmission apparatus is as illustrated in FIG. 1, in the description by reference to FIG. 2, as many like reference numerals to those used in FIG. 1 as possible are given to like portions to those described in FIG. 1.

Power transmitted to the input shaft 1 is transmitted from a hydraulic pressing device 23*a* which constitutes the toroidal-type continuously variable transmission unit 25*a* to input side disks 2 and is then transmitted to an output side disk 5*a* via power rollers 6. Of these disks, the rotational speed of input side disks 2 is measured by an input side rotation sensor 64, and the rotational speed of the output side disk 5*a* is measured by an output side rotation sensor 65, and the speeds so measured are then inputted into a control unit 66, so that a transmission ratio (a speed ratio) between both the disks 2, 5*a* (the toroidal-type continuously variable transmission unit 25*a*) can freely be calculated. In addition, the power so transmitted to the input shaft 1 is transmitted directly or via the toroidal continuously variable transmission unit 25*a* to the planet gear-type transmission unit 26*b* which is a differential unit. Then, differential components of constituent members of the planet gear-type transmission unit 26*b* are taken to the output shaft 38*a* via a clutch device 67. Note that this clutch device 67 represents a low-speed clutch 40*a* and a high-speed clutch 41*a* illustrated in FIG. 1 and FIG. 3 which will be described later on. In addition, in this embodiment, the rotational speed of the output shaft 38*a* is also designed to freely be detected by an output shaft rotation sensor 68. However, this output shaft rotation sensor 68 is provided as a fail-safe for determining the existence of failure of the input side rotation sensor 64 and the output side rotation sensor 65, and hence is not really integral to the implementation of the invention.

Figure 6:
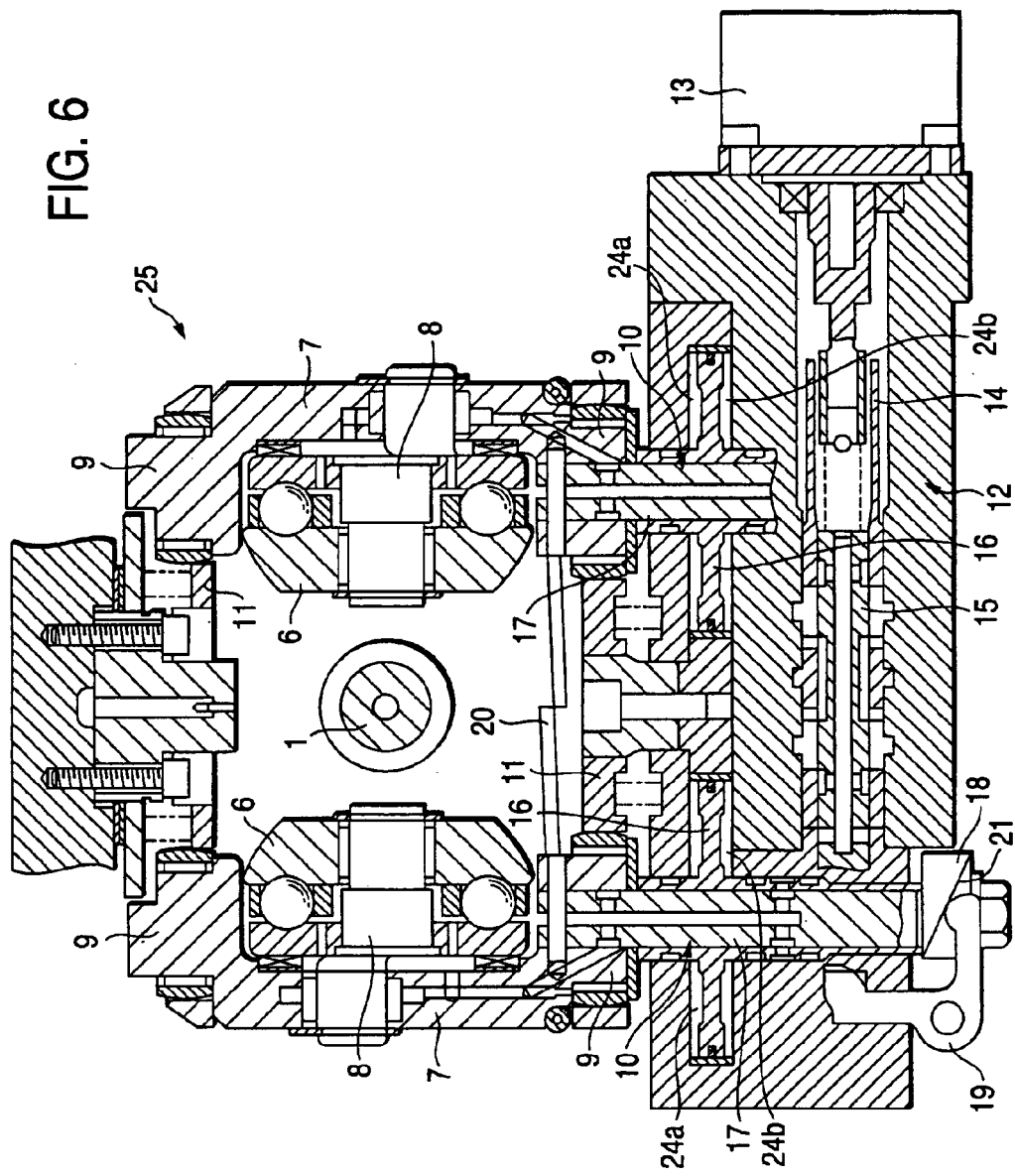
FIG. 6 is a cross-sectional view taken along the line B—B in FIG. 4.
Figure 12:
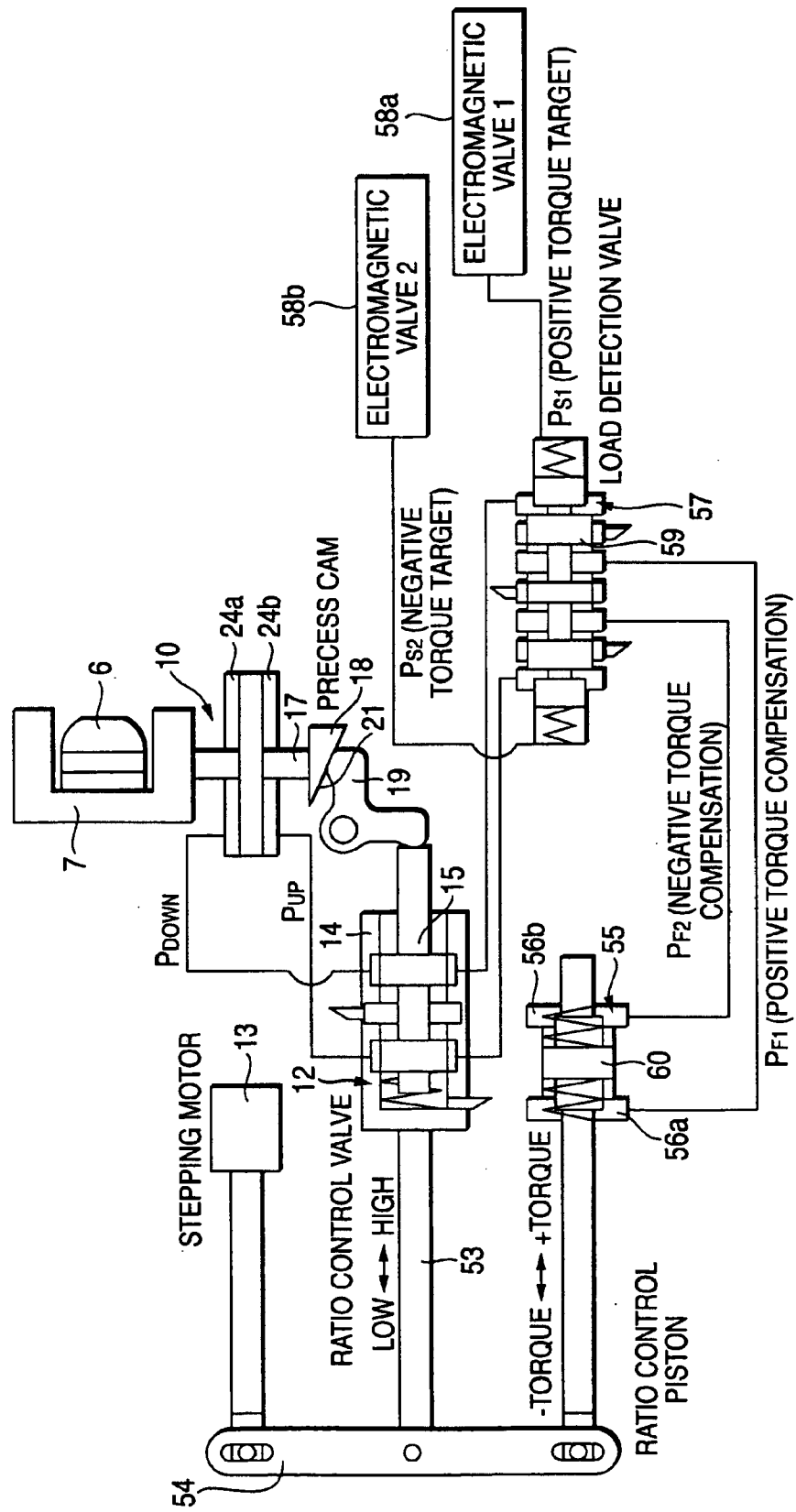
FIG. 12 is a hydraulic circuit diagram illustrating a mechanism for regulating the transmission ratio of the toroidal-type continuously variable transmission unit constituting the continuously variable transmission apparatus.

On the other hand, an oil pump 69 is driven by virtue of power taken out from the damper 63 portion, and hydraulic fluid discharged from this oil pump 9 is designed to be freely sent into the pressing device 23*a* as well as a control valve device 70 for controlling a displacement amount of an actuator 10 (for example, refer to FIG. 12) for displacing a trunnion 7 on which the power rollers 6 are supported. Note that this control valve device 70 is such as to include, in combination, the control valve 12, the differential pressure cylinder 55, the compensating control valve 57 which are previously illustrated in FIG. 12, and a high-speed shift valve 71 and a low-speed shift valve 72 shown in FIG. 3 which will be described later on. In addition, hydraulic pressures within a pair of hydraulic pressure chambers 24*a*, 24*b* provided in the actuator 10 (refer to FIGS. 3, 6, 12) are detected by a hydraulic pressure sensor 52 (in reality, a pair of hydraulic pressure sensors), and a detection signal is inputted into the control unit 66. This control unit 66 calculates a passing torque which passes through the toroidal-type continuously variable transmission unit 25*a* based on the signal from the hydraulic pressure sensor 52.

Additionally, operating modes of the control valve device 70 are changed over by the stepping motor 13, a line pressure controlling electromagnetically opening and closing valve 73, an electromagnetic valve 58*a* (58*b*) for changing over the compensating control valve 57 and a shifting electromagnetic valve 74 for changing over the high-speed shift valve 71 and the low-speed shift valve 72. Then, any of the stepping motor 13, the line pressure controlling electromagnetically opening and closing valve 73, the electromagnetic valve 58*a* (58*b*) and the shifting electromagnetic valve 74 can be changed over based on a control signal from the control unit 66.

In addition, inputted into the control unit 66 are, in addition to signals from the respective rotation sensors 64, 65, 68 and the hydraulic pressure sensor 52, a detection signal of an oil temperature sensor 75, a position signal of a position switch 76, a detection signal of an acceleration sensor 77, and a signal of a brake switch 78. Of these, the oil temperature sensor 75 is intended to detect the temperature of a lubricating oil (a traction oil) in a casing accommodated in the continuously variable transmission apparatus. Additionally, the position switch 76 is intended to send out a signal which denotes a shift position of a shift lever provided in the vicinity of a driver's seat for shifting a manual hydraulic shift valve 79 illustrated in FIG. 3 which will described later on. In addition, the acceleration sensor 77 is intended to detect the opening of an acceleration pedal. Furthermore, the brake switch 78 is intended to detect the depression of a brake pedal or operation of a parking brake and to emit a signal informing of such a fact.

In addition to sending the control signals to the stepping motor 13, the line pressure controlling electromagnetically opening and closing valve 73, the electromagnetic valve 58a (58b), and the shifting electromagnetic valve 74 based on signals from the respective switches 76, 78 and the sensors 52, 64, 65, 68, 75, 77, the control unit 66 also sends a control signal to an engine controller 80 for controlling the engine 62. Thus, as in the case with the continuously variable transmission apparatus the construction of which is described in FIG. 8, the speed ratio between the input shaft 1 and the output shaft 38a is changed, or the (passing) torque is controlled which passes through the toroidal-type continuously variable transmission unit 25a to be applied to the output shaft 38a while the vehicle is stopped or drives at extremely low speeds.

In particular, with the embodiment of the invention, the rotational speed and rotational direction of the output shaft 38a are calculated based on detection signal of the input side rotation sensor 64 and the output side rotation sensor 65 so as to control the passing torque. Namely, the control unit 66 into which detection signals of the input side and output side rotation sensors 64, 65 are inputted obtains a rotation speed $N_{ID}$ of the respective input side disks 2, 2 and an rotational speed $N_{OD}$ of the output side disk 5a based on the detection signals of both the rotation sensors so inputted. As long as the input shaft 1 is rotated by the engine 62, any of the input side disks 2, 2 and the output side disk 5a rotates at sufficient speeds. Consequently, even if inexpensive passive-type sensors are used for both the sensors 64, 65 (although active-type sensors can also be used as desired), the voltages of the detection signals can sufficiently be secured, and hence the rotation speeds of the respective disks 2, 5a can be obtained in an ensured fashion.

Then, the rotational speed $N_{OUT}$ of the output shaft 38a is obtained as a ratio for the rotational speed of the respective input side disks 2, 2 through the following expression (4) from the transmission ratio $N_{OD}/N_{ID}$ (which becomes opposite to the speed ratio $e_{CVU}$ in terms of positive and negative signs) of the toroidal-type continuously variable transmission unit 25a which is obtained from the rotational speed $N_{ID}$ of the respective input side disks 2, 2 and the rotational speed $N_{OD}$ of the output side disk 5a and the gear ratio $i_1$ of the planet gear-type transmission unit 26b in the low-speed mode in which the low-speed clutch 40a is engaged. Note that the gear ratio $i_1$ of the planet gear-type transmission unit 26b is a ratio ($i_1=m_{49}/m_{47}$) of the number of teeth $m_{49}$ of the ring gear 49a and the number of teeth $m_{47}$ of a primary sun gear 47.

$$N_{OUT}=(i_1-1-N_{OD}/N_{ID})/i_1 \quad (4)$$

Consequently, an absolute value of the rotational speed of the output shaft 38a becomes $N_{OUT} \times N_{ID}$. In addition, as is clear from the above expression (4), in case $N_{OD}/N_{ID}=i_1-1$, the output shaft 38a stops, in case $N_{OD}/N_{ID}<i_1-1$, the output shaft 38a rotates in a direction in which the automotive vehicle is reversed, and in case $N_{OD}/N_{ID}<i_1-1$, the output shaft 38a rotates in a direction in which the automotive vehicle is advanced. Consequently, according to the construction of the embodiment, not only the rotational speed but also the rotational direction of the output shaft 38a when it is stopped and rotates at extremely low speeds can be identified in an ensured fashion and with a sufficient responsiveness (the shortness of time until a changed fact can be identified) being secured.

In addition, with the continuously variable transmission apparatus of the embodiment, a pressing force generated by the pressing device 23a is made smaller than a pressing force generated while the vehicle runs normally based on signals from the output shaft rotation sensor 68, the position switch 76 and the acceleration sensor 77 when the vehicle is stopped or drives at extremely low speeds. Namely, when the shift lever is determined to be shifted in the forward position (D range or L range) or in the reverse position (R range) based on a signal from the position switch 76, the vehicle speed is determined to be zero or extremely low (for example, 1 km/h or lower), and the acceleration pedal is determined not to be depressed from a signal from the acceleration sensor 77, the hydraulic pressure that is introduced into the pressing device 23 is lowered to increase the creep ratio (slip ratio) at the traction portions.

Due to this, according to the construction of the embodiment, even if the transmission ratio of the toroidal-type continuously variable transmission unit 25a is slightly changed by disturbances, the change in the torque that passes through the toroidal-type continuously variable transmission unit 25a can be suppressed to a small level. As a result, when the vehicle is stopped or is run at extremely low speeds, even if the transmission ratio of the toroidal-type continuously variable transmission unit 25a is slightly changed by disturbances, the change in effort required to depress the brake pedal is suppressed to a small level. Then, it can be avoided that the driver feels an abnormal feeling or is fatigued. In addition, by suppressing the hydraulic pressure supplied to the pressing device 23a to a small level, the driving torque of the fluid supply pump can be decreased, and this can contribute to improving the fuel efficiency. On the other hand, when the vehicle is run normally, the pressing force generated by the pressing device 23a becomes sufficiently large. In this state, the creep amount at the traction portions is decreased to thereby secure the transmission efficiency at the traction portions.

Figure 10:
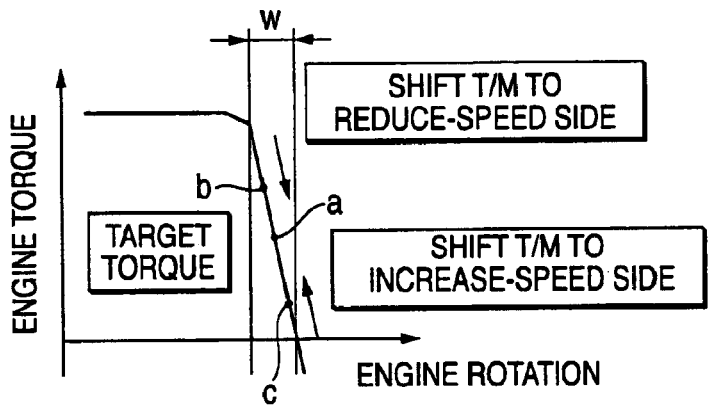
FIG. 10 is a diagram illustrating a relation between rotational speed and torque of an engine for explanation of a state in which the transmission ratio is controlled by the control device.
Figure 11:
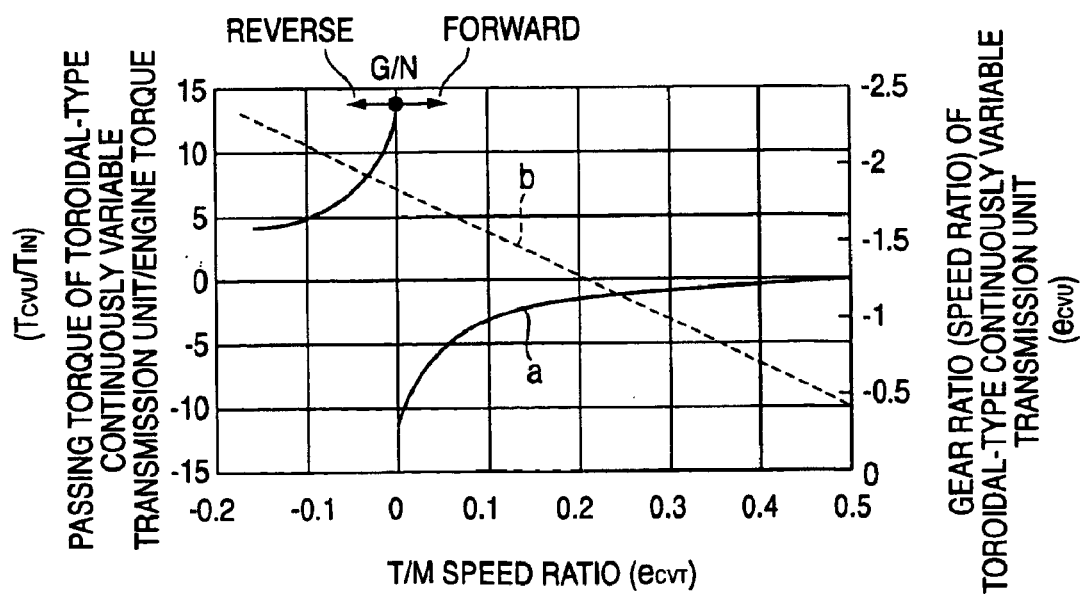
FIG. 11 is a diagram illustration relations between a torque that passes through the toroidal-type continuously variable transmission unit and a transmission ratio thereof, and a transmission ratio of the whole continuously variable transmission apparatus.

Furthermore, with the continuously variable transmission apparatus of the embodiment, the target value (related to the axis of ordinate in FIG. 10, the position indicated by the point a in the same figure) of the torque that passes through the toroidal-type continuously variable transmission unit 25a is changed based on signals from the output shaft rotation sensor 68 and the input side and output side rotation sensors 64, 65, the position switch 76, and the brake switch 78. Namely, in the event that the shift lever is determined to be shifted in the forward position (D range or L range) or the reverse range (R range) based on a signal from the position switch 76, the vehicle speed is zero or extremely low (for example, 1 km/h or lower), and the brake pedal, is depressed or the parking brake is applied, the target value of the passing torque is lowered (the point a in FIG. 10 is displaced downwardly along the axis of ordinate). As a result, the torque applied to the output shaft 38a is decreased, and there can be eliminated a risk that the vehicle starts abruptly. In addition, even in a case where the vehicle is brought to a standstill with the brake pedal being depressed, effort required only has to be limited, and the driver can be restrained from being fatigued. Furthermore, fuel that the engine consumes can be decreased by such an extent that the output torque of the engine 62 can be suppressed, and this can contribute to saving the natural resources.

On the contrary, in the event that the shift lever is positioned at the forward position (D range or L range) or at the reverse position (R range), the speed is zero or extremely low (for example, 1 km/h or lower), but the brake pedal is not depressed and the parking brake is not applied, the target value of the passing torque is set relatively high. As a result, when the driver attempts to start the vehicle, the vehicle can be started without any sluggish or hesitating motion. In particular, in the event that the vehicle is attempted to be started from the standstill on the climbing slope, even if there exists a certain delay in operating the acceleration pedal, the vehicle can be started without having to be reversed. In addition, as long as the vehicle is not driving at extremely low speeds (for example, as long as the vehicle speed exceeds 1 km/h), the vehicle can be run at low speeds without depressing the acceleration pedal but only by operating the brake pedal. As a result, parking the vehicle in a garage or along the curb can be facilitated. In addition, with the embodiment of the invention, in the event that the shift lever is shifted to a non-driving position, that is, at a parking position (P range) or a neutral position (N range), the clutch device 67 (both the low-speed and high-speed clutches 40*a*, 41*a*) is disengaged to thereby prevent the transmission of driving force to the output shaft 38*a*. As this occurs, the engine controller 80 controls the engine 62 to rotate at idling and with low torque without any delay.

Next, a preferred control circuit to the control of the continuously variable transmission apparatus of the embodiment that is constructed as has been described heretofore will be described briefly by reference to FIG. 3. Note that since the construction of the part for regulating the transmission ratio of the toroidal-type continuously variable transmission unit by controlling the stroke of the actuator 10 by the control valve 12, the stepping motor 13, the precess cam 18, the link arm 19 and the differential pressure cylinder 55 is identical with the construction of the system illustrated previously in FIG. 12, a description that will repeat the same will be omitted here.

In a hydraulic circuit illustrated in FIG. 3, a hydraulic fluid that is drawn in from an oil or fluid reservoir 81 and which is then discharged from the oil pumps 69*a*, 69*b* is designed to be freely regulated to a predetermined pressure by pressure regulator valves 82*a*, 82*b*. The oil pumps 69*a*, 69*b* correspond to the oil pump 69 shown in FIG. 1. In addition, of both the pressure regulator valves 82*a*, 82*b*, the pressure regulation by the pressure regulator valve 82*a* for regulating the hydraulic pressure sent to the manual hydraulic shift valve 79 side, which will be described next, is designed to be freely regulated based on the opening and closing of the line pressure controlling electromagnetically opening and closing valve 73. Then, the hydraulic fluid whose pressure is regulated by both the pressure regulator valves 82*a*, 82*b* is designed to be freely sent not only into the actuator 10 via the control valve 12 but also into the compensating control valve 57 for regulating the stroke of the differential pressure cylinder 55 based on the opening and closing of the electromagnetic valves 58*a*, 58*b*.

In addition, the hydraulic fluid is also designed to be sent into the hydraulic pressing device 23*a*. Additionally the hydraulic fluid is designed to be freely sent into the hydraulic pressure chambers of the low-speed clutch 40*a* (40) or the high-speed clutch 41*a* (41) via the manual hydraulic shift valve 79 and the high-speed shift valve 71 or the low-speed shift valve 72. Of the respective shift valves 79, 71, 72, the manual hydraulic shift valve 79 is operated by the operation lever (the shift lever) provided in the vicinity of the driver's seat for operation by the driver to select Parking range (P), reverse (rearward movement) range (R), neutral range (N), drive (normal forward movement) range (D), and high driving-force forward range (L). The changing of the modes of the manual hydraulic shift lever 79 is as shown in the drawing. Note that the constructions and the designation of functions of the respective valves including this manual hydraulic shift valve 79 are based on a general procedure of the machine drawing related to hydraulic equipment.

In addition, both the high-speed and low-speed shift valves 71, 72 are such that the communications thereof are changed over through the supply and discharge of hydraulic fluid based on the shift of the shifting shift valve 83 which is shifted by the shifting electromagnetic valve 74 and such that when one of the shift valves 71 (or 72) sends the hydraulic fluid into the hydraulic pressure chamber of the high-speed clutch 41*a* (or the low-speed clutch 40*a*), the other shift valve 72 (or 71) discharge the hydraulic fluid from the hydraulic pressure chamber of the low-speed clutch 40*a* (or the high-speed clutch 41*a*).

The control unit that has the hydraulic circuit constructed as has been described above and which is incorporated in the continuously variable transmission apparatus that is constructed as is illustrated in FIGS. 1 to 2 has the following functions (1) to (6).

Function (1): to change the relative speed of a plurality of gears which constitute the planet gear-type transmission unit 26*b* in a low-speed mode, or during an operation with the low-speed clutch 40*a* being engaged and the high-speed clutch 41*a* being disengaged, by regulating the transmission ratio of the toroidal-type continuously variable transmission unit 25*a*, and to freely convert the rotational state of the output shaft 38*a* from the forward to reverse rotations or vice versa with a stationary state being held therebetween, with the input shaft 1 being kept rotating in one direction by the engine 62 which is the drive source.

Figure 7:
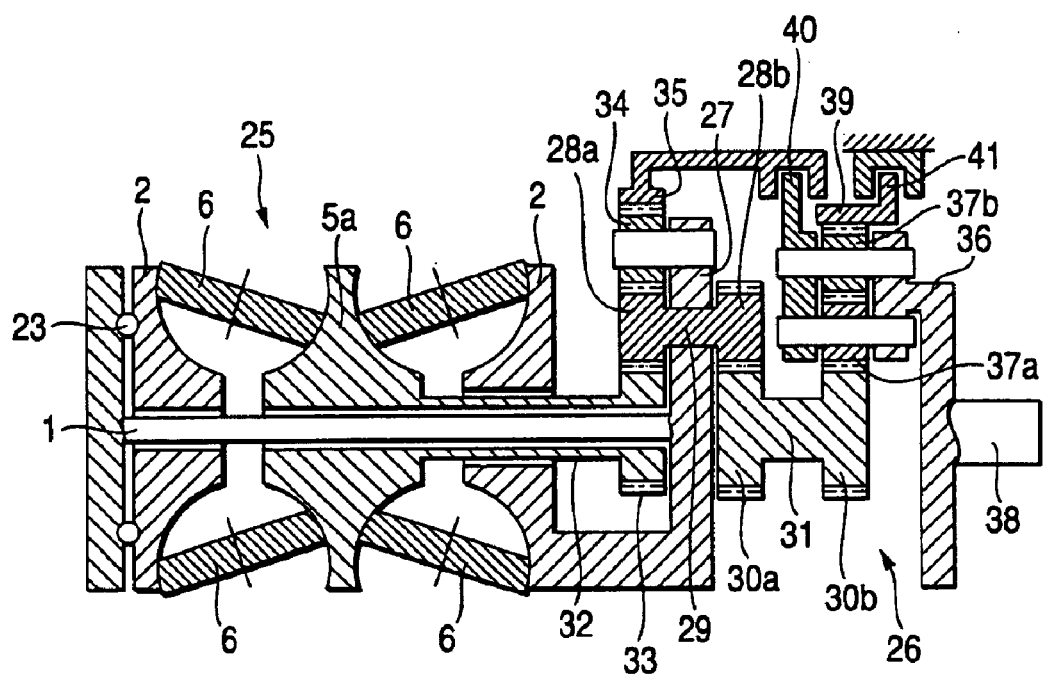
FIG. 7 is a schematic cross-sectional view illustrating an example of a conventionally known continuously variable transmission apparatus.
Figure 8:
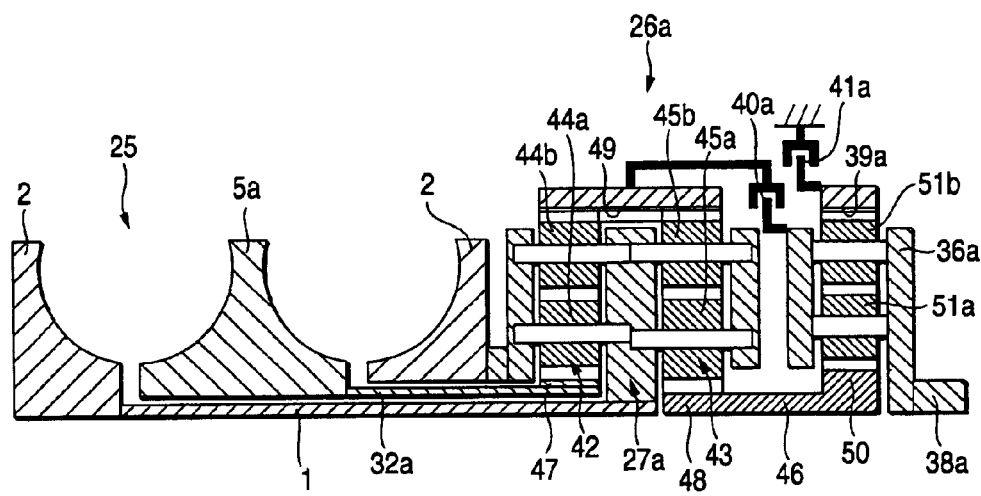
FIG. 8 is a schematic cross-sectional view illustrating an example of a continuously variable transmission apparatus in which a transmission ratio is controlled by a control device.
Figure 9:
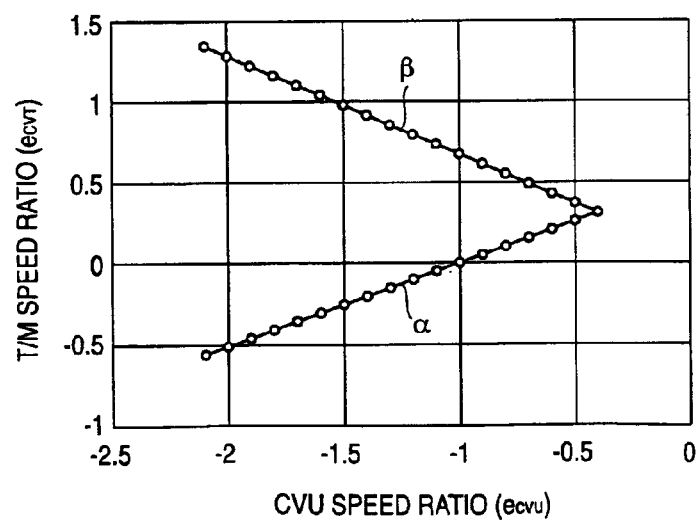
FIG. 9 is a diagram illustrating a relation between a speed ratio of a toroidal-type continuously variable transmission unit (CVU) incorporated in the continuously variable transmission apparatus and a speed ratio of the whole continuously variable transmission apparatus (T/M)

This function is similar to that of the conventionally known continuously variable transmission apparatus illustrated in FIG. 7 or the continuously variable transmission apparatus the construction of which is illustrated in FIG. 8.

Function (2): to change the transmission ratio between the input shaft 1 and the output shaft 38*a* in a high-speed mode, or during an operation with the low-speed clutch 40*a* being disengaged and the high-speed clutch 41*a* being engaged, by regulating the transmission ratio of the toroidal-type continuously variable transmission unit 25*a*.

This function also is similar to that of the conventionally known continuously variable transmission apparatus illustrated in FIG. 7 or the continuously variable transmission apparatus the construction of which is illustrated in FIG. 8.

Function (3): to obtain the rotational speed and rotational direction of the output shaft 38*a* based on measured values of the input side and output side rotation sensors 64, 65 in the low-speed mode, or during the operation with the low-speed clutch 40*a* being engaged and the high-speed clutch 41*a* being disengaged, and to regulate the torque which passes the toroidal-type continuously variable transmission unit 25*a* by regulating the transmission ratio of the toroidal-type continuously variable transmission unit 25*a*.

Function (4): to cut off totally the engagement of both the low-speed clutch 40*a* and the high-speed clutch 41*a* with the operation lever being shifted to the non-driving position, or the parking range or neutral range being selected.

Function (5): to make smaller the pressing force generated by the pressing device 23 while the vehicle is stopped or runs at extremely low speeds than the pressing force generated thereby when the vehicle drives normally.

Function (6): in the event that, with the vehicle being stopped or driving at extremely low speeds, a brake means for stopping the vehicle is operated, to make lower the torque that passes through the toroial continuously variable transmission unit 25*a* when compared with a case where the brake means is not operated.

Note that in the illustrated embodiment, in order to regulate the speed ratio of the continuously variable transmission apparatus to the vicinity of infinite, the stroke of the differential pressure cylinder 55 for finely regulating the transmission ratio of the toroial continuously variable transmission unit 25*a* is suppressed to a small range, so that the transmission ratio is not regulated excessively. In addition, the differential pressure cylinder 55 is designed to be shifted by virtue of the difference in pressure within the hydraulic pressure chambers 24*a*, 24*b* of the actuator 10. Consequently, by trying to make the construction of the part for the fine regulation of the transmission ratio free from failure, a highly reliable continuously variable transmission apparatus can be realized.

Since the invention is constructed and functions as has been described heretofore, the rotational speed and rotational direction of the output shaft can be identified accurately without using expensive rotation sensors when the vehicle is stopped or drives at extremely low speeds. Thus, this can contribute to realization of a continuously variable transmission apparatus which can obtain an infinite transmission ratio.

What is claimed is:

1. A continuously variable transmission apparatus having an input shaft, an output shaft, a toroidal-type continuously variable transmission unit, a gear-type differential unit in combination with a plurality of gears, and a control unit for controlling a change in transmission ratio of the toroidal-type continuously variable transmission unit, wherein the toroidal-type continuously variable transmission unit has;

an input side disk rotatably driven by the input shaft, an output side disk supported coaxially with the input side disk and rotatably relative to the input side disk, a plurality of power rollers interposed between the input side disk and the output side disk, an input side rotation sensor for measuring a rotational speed of the input side disk, and an output side rotation sensor for measuring a rotational speed of the output side disk, wherein the differential unit has;

a first input portion rotated together with the input side disk by the input shaft, and a second input portion connected to the output side disk, whereby a rotation according to a difference in speed between the first and second input portions is taken to be transmitted to the output shaft, and wherein the control unit regulates the transmission ratio of the toroidal-type continuously variable transmission unit so as to change relative speeds of the plurality of gears constituting the differential unit to thereby convert the rotational state of the output shaft to forward and backward rotations with a stationary state being interposed therebetween, with the input shaft being kept rotating in one direction, and to calculate a rotational speed of the output shaft based on a rotational speed of the input side disk obtained by the input side rotation sensor and a rotational speed of the output side disk obtained by the output side rotation sensor, and a gear ratio of the differential unit.

2. A continuously variable transmission apparatus as set forth in claim 1, wherein the control unit further regulates a torque which passes through the toroidal-type continuously variable transmission unit to be transmitted to the output shaft according to the rotational speed of the output shaft so calculated by changing the transmission ratio of the toroidal-type continuously variable transmission unit.

* * * * *